(12) United States Patent
Woolfsmith et al.

(10) Patent No.: US 8,048,219 B2
(45) Date of Patent: **\*Nov. 1, 2011**

(54) METHOD OF PLACING CONCRETE

(75) Inventors: Daniel Woolfsmith, Bridgeville, PA (US); Michael T. Williams, Beaver Falls, PA (US); Rick Hughes, Beaver, PA (US); Michael R. Kelley, Butler, PA (US); John K. Madish, Beaver Falls, PA (US); Kristen Van Buskirk, Aliquippa, PA (US); Tricia Guevara Ladely, Beaver, PA (US)

(73) Assignee: NOVA Chemicals Inc., Moon Township, PA (US)

( \* ) Notice: Subject to any disclaimer, the term of this patent is extended or adjusted under 35 U.S.C. 154(b) by 377 days.

This patent is subject to a terminal disclaimer.

(21) Appl. No.: 12/212,046

(22) Filed: Sep. 17, 2008

(65) Prior Publication Data

US 2009/0081446 A1 Mar. 26, 2009

Related U.S. Application Data

(60) Provisional application No. 60/973,848, filed on Sep. 20, 2007.

(51) Int. Cl.
*C04B 16/08* (2006.01)

(52) U.S. Cl. ........ 106/713; 106/644; 106/705; 106/716; 106/718; 106/737; 106/789; 106/DIG. 1; 106/DIG. 2

(58) Field of Classification Search .................. 106/713, 106/644, 705, 716, 718, 737, 789, DIG. 1, 106/DIG. 2
See application file for complete search history.

(56) References Cited

U.S. PATENT DOCUMENTS

| 2,061,425 | A | 11/1936 | Karstens |
| 2,983,692 | A | 5/1961 | D'Alelio |
| 3,021,291 | A | 2/1962 | Thiessen |
| 3,023,175 | A | 2/1962 | Rodman, Jr. |
| 3,214,292 | A | 10/1965 | Sefton |
| 3,214,393 | A | 10/1965 | Sefton |

(Continued)

FOREIGN PATENT DOCUMENTS

DE 203 16 376 U1 2/2004

(Continued)

OTHER PUBLICATIONS

U.S. Appl. No. 11/361,654, filed Feb. 24, 2006, Tricia Guevara, NOVA Chemicals Inc.

(Continued)

*Primary Examiner* — Paul Marcantoni
(74) *Attorney, Agent, or Firm* — Gary F. Matz

(57) ABSTRACT

A method of placing a concrete compositions including a) combining 3-40 volume percent cement, 5-50 volume percent fine aggregate, 5-50 volume percent coarse aggregate, and 10-22 volume percent water; b) adding 1.5-40 volume percent of prepuff particles to form a concrete composition; and c) pumping the concrete composition to a point higher in elevation than the delivery point of the concrete to place the concrete. The concrete composition contains less than 30 volume percent of other light weighting aggregates and the prepuff particles have an average particle diameter of from 0.2 mm to 8 mm, a bulk density of from 0.02 g/cc to 0.64 g/cc, an aspect ratio of from 1 to 3. The slump value of the placed concrete measured according to ASTM C 143 is greater than 1 inch and the concrete has a density of from about 40 to about 135 lb./ft$^3$.

12 Claims, 4 Drawing Sheets

U.S. PATENT DOCUMENTS

| | | |
|---|---|---|
| 3,257,338 A | 6/1966 | Sefton |
| 3,272,765 A | 9/1966 | Sefton |
| 3,547,412 A | 12/1970 | Klages |
| 3,788,020 A | 1/1974 | Gregori |
| 3,869,295 A | 3/1975 | Bowles et al. |
| 4,026,723 A | 5/1977 | Grof et al. |
| 4,094,110 A | 6/1978 | Dickens et al. |
| 4,157,640 A | 6/1979 | Joannes |
| 4,223,501 A | 9/1980 | Delozier |
| 4,241,555 A | 12/1980 | Dickens et al. |
| 4,250,674 A | 2/1981 | Feist |
| 4,265,964 A | 5/1981 | Burkhart |
| 4,267,135 A | 5/1981 | Stroud et al. |
| 4,268,236 A | 5/1981 | Peille |
| 4,298,394 A | 11/1981 | Leeming et al. |
| 4,303,756 A | 12/1981 | Kajimura et al. |
| 4,303,757 A | 12/1981 | Kajimura et al. |
| 4,332,754 A | 6/1982 | Meunier et al. |
| 4,348,164 A | 9/1982 | Fujii et al. |
| 4,354,810 A | 10/1982 | Stidham |
| 4,376,741 A | 3/1983 | Stenzel |
| 4,379,107 A | 4/1983 | Berner |
| 4,382,759 A | 5/1983 | Vassalli |
| 4,399,086 A | 8/1983 | Walter |
| 4,412,961 A | 11/1983 | DiBlasi et al. |
| 4,435,345 A | 3/1984 | Colombo |
| 4,447,382 A | 5/1984 | Spurlock et al. |
| 4,485,059 A | 11/1984 | Krutchen et al. |
| 4,486,369 A | 12/1984 | Schafler et al. |
| 4,487,731 A | 12/1984 | Kobayashi |
| 4,489,023 A | 12/1984 | Proksa |
| 4,492,664 A | 1/1985 | Bruno |
| 4,498,660 A | 2/1985 | Brema et al. |
| 4,504,429 A | 3/1985 | Griffiths |
| 4,507,255 A | 3/1985 | Shizawa |
| 4,518,550 A | 5/1985 | Miettinen et al. |
| 4,530,806 A | 7/1985 | Melchior |
| 4,551,958 A | 11/1985 | Reneault et al. |
| 4,559,003 A | 12/1985 | Poncet |
| 4,564,487 A | 1/1986 | Bennett |
| 4,567,008 A | 1/1986 | Griffiths |
| 4,572,865 A | 2/1986 | Gluck et al. |
| 4,581,186 A | 4/1986 | Larson |
| 4,585,603 A | 4/1986 | Furuta et al. |
| 4,607,061 A | 8/1986 | Schmidt |
| 4,641,468 A | 2/1987 | Slater |
| 4,653,718 A | 3/1987 | Dickens |
| 4,666,393 A | 5/1987 | Kumasaka et al. |
| 4,685,872 A | 8/1987 | Erlenbach |
| 4,725,632 A | 2/1988 | Vess |
| 4,756,860 A | 7/1988 | Hooper et al. |
| 4,761,256 A | 8/1988 | Hardenbrook et al. |
| 4,783,287 A | 11/1988 | Eichberger et al. |
| 4,832,885 A | 5/1989 | Gross |
| 4,884,382 A | 12/1989 | Horobin |
| 4,885,888 A | 12/1989 | Young |
| 4,889,310 A | 12/1989 | Boeshart |
| 4,911,628 A | 3/1990 | Heilmayr et al. |
| 4,953,334 A | 9/1990 | Dickens |
| 4,956,133 A | 9/1990 | Payne |
| 4,972,646 A | 11/1990 | Miller et al. |
| 4,981,427 A | 1/1991 | Prignitz |
| 5,067,298 A | 11/1991 | Petersen |
| D323,222 S | 1/1992 | Roland |
| 5,087,185 A | 2/1992 | Yada et al. |
| 5,140,794 A | 8/1992 | Miller |
| 5,187,905 A | 2/1993 | Pourtau et al. |
| 5,211,751 A | 5/1993 | Arfaei et al. |
| 5,229,138 A | 7/1993 | Carotti |
| 5,333,429 A | 8/1994 | Cretti |
| 5,375,988 A | 12/1994 | Klahre |
| 5,388,975 A | 2/1995 | Proska et al. |
| 5,390,459 A | 2/1995 | Mensen |
| 5,411,389 A | 5/1995 | Kellerhof et al. |
| 5,414,972 A | 5/1995 | Ruiz et al. |
| D360,700 S | 7/1995 | Myers et al. |
| 5,454,199 A | 10/1995 | Blom et al. |
| 5,459,971 A | 10/1995 | Sparlman |
| 5,474,722 A | 12/1995 | Woodhams |
| RE35,194 E | 4/1996 | Gerber |
| 5,505,599 A | 4/1996 | Kemerer et al. |
| 5,512,222 A | 4/1996 | Sabol et al. |
| 5,524,400 A | 6/1996 | Schmechel |
| D373,836 S | 9/1996 | Bado et al. |
| 5,566,518 A | 10/1996 | Martin et al. |
| 5,568,710 A | 10/1996 | Smith et al. |
| 5,570,552 A | 11/1996 | Nehring |
| 5,580,378 A | 12/1996 | Shulman |
| 5,582,840 A | 12/1996 | Pauw et al. |
| 5,587,182 A | 12/1996 | Sulzbach et al. |
| 5,620,710 A | 4/1997 | Florentini et al. |
| 5,622,556 A | 4/1997 | Shulman |
| 5,625,989 A | 5/1997 | Brubaker et al. |
| 5,629,027 A | 5/1997 | Florentini et al. |
| 5,639,483 A | 6/1997 | Florentini et al. |
| 5,643,510 A | 7/1997 | Succh |
| 5,657,600 A | 8/1997 | Mensen |
| 5,665,286 A | 9/1997 | Sulzbach et al. |
| 5,665,287 A | 9/1997 | Florentini et al. |
| 5,701,710 A | 12/1997 | Tremeling |
| 5,709,060 A | 1/1998 | Vaughan et al. |
| 5,725,652 A | 3/1998 | Shulman |
| 5,749,960 A | 5/1998 | Belyayev |
| 5,771,648 A | 6/1998 | Miller et al. |
| 5,784,850 A | 7/1998 | Elderson |
| 5,787,665 A | 8/1998 | Carlin et al. |
| 5,792,481 A | 8/1998 | Cretti |
| 5,798,064 A | 8/1998 | Peterson |
| D399,010 S | 9/1998 | Current |
| 5,804,113 A | 9/1998 | Blackwell et al. |
| 5,809,725 A | 9/1998 | Cretti |
| 5,809,727 A | 9/1998 | Mensen |
| 5,809,728 A | 9/1998 | Tremeling |
| 5,822,940 A | 10/1998 | Carlin et al. |
| D401,361 S | 11/1998 | Mitchell |
| 5,844,015 A | 12/1998 | Steilen et al. |
| 5,845,449 A | 12/1998 | Vaughan et al. |
| 5,852,907 A | 12/1998 | Tobin et al. |
| 5,853,634 A | 12/1998 | Ont Kean |
| D406,360 S | 3/1999 | Finkell, Jr. |
| 5,890,337 A | 4/1999 | Boeshart |
| 5,896,714 A | 4/1999 | Cymbala et al. |
| D411,628 S | 6/1999 | Dyer |
| 5,913,791 A | 6/1999 | Balkwin |
| 5,945,048 A | 8/1999 | Ensinger |
| D414,275 S | 9/1999 | Azar |
| 5,966,885 A | 10/1999 | Chatelain |
| D418,926 S | 1/2000 | Owens et al. |
| D419,697 S | 1/2000 | Kroesbergen |
| 6,021,618 A | 2/2000 | Elderson |
| 6,030,446 A | 2/2000 | Dity et al. |
| D422,094 S | 3/2000 | Wolfrum |
| 6,036,898 A | 3/2000 | Sulzbach et al. |
| RE36,674 E | 4/2000 | Gluck et al. |
| 6,045,350 A | 4/2000 | Cretti |
| 6,098,367 A | 8/2000 | Fridman et al. |
| 6,119,418 A | 9/2000 | Johnson |
| 6,127,439 A | 10/2000 | Berghmans |
| 6,147,133 A | 11/2000 | Sulzbach et al. |
| 6,160,027 A | 12/2000 | Crevevoeur et al. |
| RE37,012 E | 1/2001 | Florentini et al. |
| 6,167,624 B1 | 1/2001 | Lanahan et al. |
| 6,170,220 B1 | 1/2001 | Moore, Jr. |
| 6,178,711 B1 | 1/2001 | Laird et al. |
| RE37,075 E | 2/2001 | Florentini et al. |
| D437,644 S | 2/2001 | Russo |
| RE37,115 E | 3/2001 | Florentini et al. |
| 6,202,375 B1 | 3/2001 | Kleinschmidt |
| 6,206,669 B1 | 3/2001 | Lewit et al. |
| D440,327 S | 4/2001 | Keating et al. |
| 6,226,943 B1 | 5/2001 | Grinshpun et al. |
| 6,230,462 B1 | 5/2001 | Be'livean |
| 6,233,892 B1 | 5/2001 | Tylman |
| 6,235,367 B1 | 5/2001 | Holmes et al. |
| 6,242,540 B1 | 6/2001 | Crevevoeur et al. |
| 6,250,024 B1 | 6/2001 | Sculthorpe et al. |
| 6,264,734 B1 | 7/2001 | Dickens |

| | | | |
|---|---|---|---|
| 6,272,749 B1 | 8/2001 | Boeshart et al. | |
| D449,392 S | 10/2001 | Kulik | |
| 6,298,622 B1 | 10/2001 | Cretti | |
| 6,301,854 B1 | 10/2001 | Daudet et al. | |
| 6,314,694 B1 | 11/2001 | Cooper et al. | |
| 6,314,697 B1 | 11/2001 | Moore, Jr. | |
| 6,318,040 B1 | 11/2001 | Moore, Jr. | |
| 6,322,651 B1 | 11/2001 | Phelps | |
| 6,336,301 B1 | 1/2002 | Moore, Jr. | |
| 6,350,308 B1 | 2/2002 | Dickens | |
| D455,843 S | 4/2002 | Albany et al. | |
| 6,378,260 B1 | 4/2002 | Williamson et al. | |
| 6,385,942 B1 | 5/2002 | Grossman et al. | |
| 6,412,243 B1 | 7/2002 | Sutelan | |
| 6,418,687 B1 | 7/2002 | Cox | |
| 6,438,918 B2 | 8/2002 | Moore, Jr. | |
| 6,444,073 B1 | 9/2002 | Reeves et al. | |
| 6,481,178 B2 | 11/2002 | Moore, Jr. | |
| 6,494,012 B2 | 12/2002 | Seng | |
| D469,885 S | 2/2003 | Zen | |
| D470,602 S | 2/2003 | Pate | |
| 6,530,185 B1 | 3/2003 | Scott et al. | |
| 6,531,077 B1 | 3/2003 | Flarup-Knudsen | |
| 6,537,054 B2 | 3/2003 | Kitahama et al. | |
| 6,647,686 B2 | 11/2003 | Dunn et al. | |
| 6,655,944 B2 | 12/2003 | Massarotto et al. | |
| 6,662,503 B2 | 12/2003 | Cowell et al. | |
| D487,317 S | 3/2004 | Guertin | |
| 6,701,684 B2 | 3/2004 | Stadter | |
| 6,708,460 B1 | 3/2004 | Elderson | |
| D493,545 S | 7/2004 | Lancia et al. | |
| D494,284 S | 8/2004 | Wenrick et al. | |
| 6,800,129 B2 | 10/2004 | Jardine et al. | |
| 6,820,384 B1 | 11/2004 | Pfeiffer | |
| 6,833,095 B2 | 12/2004 | Sulzbach et al. | |
| 6,833,188 B2 | 12/2004 | Semmens | |
| 6,851,235 B2 | 2/2005 | Baldwin | |
| 6,854,230 B2 | 2/2005 | Starke | |
| 6,969,423 B2 | 11/2005 | Li et al. | |
| 7,032,357 B2 | 4/2006 | Cooper et al. | |
| 2001/0009683 A1 | 7/2001 | Kitahama et al. | |
| 2002/0026760 A1 | 3/2002 | Moore, Jr. | |
| 2002/0117769 A1 | 8/2002 | Arch et al. | |
| 2002/0139066 A1 | 10/2002 | Szymanski et al. | |
| 2002/0184846 A1 | 12/2002 | Crowder | |
| 2003/0029106 A1 | 2/2003 | Cooper et al. | |
| 2003/0079420 A1 | 5/2003 | Kassen et al. | |
| 2003/0079438 A1 | 5/2003 | Stephens et al. | |
| 2003/0085483 A1 | 5/2003 | Kroeger | |
| 2003/0172607 A1 | 9/2003 | Brandes | |
| 2004/0017652 A1 | 1/2004 | Billington et al. | |
| 2004/0065034 A1 | 4/2004 | Messenger et al. | |
| 2004/0065973 A1 | 4/2004 | Ebbing et al. | |
| 2004/0096642 A1 | 5/2004 | Maruyama et al. | |
| 2004/0152795 A1 | 8/2004 | Arch et al. | |
| 2004/0202742 A1 | 10/2004 | Winter | |
| 2004/0216415 A1 | 11/2004 | Pfeiffer et al. | |
| 2004/0231916 A1 | 11/2004 | Englert et al. | |
| 2005/0034401 A1 | 2/2005 | Sutelan et al. | |
| 2005/0086906 A1 | 4/2005 | Bathon et al. | |
| 2006/0217464 A1 | 9/2006 | Guevara et al. | |
| 2006/0225618 A1 | 10/2006 | Guevara et al. | |
| 2007/0062415 A1 | 3/2007 | Guevara et al. | |

FOREIGN PATENT DOCUMENTS

| | | |
|---|---|---|
| EP | 0 459 924 A1 | 12/1991 |
| EP | 0 464 008 B1 | 2/1995 |
| EP | 0 652 188 A1 | 5/1995 |
| EP | 0 693 597 B1 | 1/1996 |
| FR | 2 539 410 A1 | 7/1984 |
| GB | 2 365 456 A | 2/2002 |
| JP | 90/71449 | 3/1997 |
| WO | 98/02397 | 1/1998 |
| WO | 00/02826 | 1/2000 |
| WO | 00/61519 | 10/2000 |
| WO | 01/66485 A2 | 9/2001 |
| WO | 02/20916 A1 | 3/2002 |
| WO | 02/35020 A3 | 5/2002 |
| WO | 2004/009929 A1 | 1/2004 |

OTHER PUBLICATIONS

U.S. Appl. No. 11/387,427, filed Mar. 22, 2006, Tricia Guevara, NOVA Chemicals Inc.

U.S. Appl. No. 11/387,198, filed Mar. 22, 2006, Tricia Guevara, NOVA Chemicals Inc.

U.S. Appl. No. 11/521,210, filed Sep. 14, 2006, Tricia Guevara, NOVA Chemicals Inc.

U.S. Appl. No. 11/586,120, filed Oct. 25, 2006, Tricia Guevara, NOVA Chemicals Inc.

U.S. Appl. No. 11/931,401, filed Oct. 31, 2006, Tricia Guevara, NOVA Chemicals Inc.

U.S. Appl. No. 11/931,493, filed Oct. 31, 2006, Tricia Guevara, NOVA Chemicals Inc.

U.S. Appl. No. 11/361,189, filed Feb. 24, 2006, Jay Bowman, NOVA Chemicals Inc.

U.S. Appl. No. 12/044,360, filed Mar. 10, 2008, Shawn P. Jarvie, NOVA Chemicals Inc.

U.S. Appl. No. 12/110,417, filed Apr. 28, 2008, Tricia G. Ladely, NOVA Chemicals Inc.

U.S. Appl. No. 12/190,724, filed Aug. 13, 2008, Michael Williams, NOVA Chemicals Inc.

U.S. Appl. No. 12/212,059, filed Sep. 17, 2008, Daniel Woolfsmith, NOVA Chemicals Inc.

Sri Ravindrarajah, R. and Sivakumar, R., "Effect of Polystyrene Particle Shape on the Properties of Lightweight Aggregate Concrete", Proceedings of the South African Conference on Polymers in Concrete, Jul. 2000, Kruger National Park, South Africa, pp. 195-203.

Sabaa, B.A., and Sri Ravindrarajah, R., "Compressive and Tensile Strength of "Adjusted Density" Concrete Using Expanded Polystyrene Aggregate", Proceedings of the South African Conference on Polymers in Concrete, Jul. 2000, Kruger National Park, South Africa, pp. 133-141.

Sabaa, B.A., and Sri Ravindrarajah, R., "Controlling freeze and thaw durability of structural grade concrete with recycled expanded aggregate", Proceedings of the Second International Symposium on Structural Lightweight Aggregate Concrete, Jun. 18-22, 2000, Kristiansand, Norway, pp. 709-718.

Sri Ravindrarajah, R. and Tuck, A.J., "Properties of polystyrene aggregate concrete", Proc. of the 13th Australasian Conf. on the Mechanics of Structures & Materials, Jul. 5-6, 1993, Wollongong, Australia, pp. 705-721.

Sri Ravindrarajah, R. and Tuck, A.J., "Properties of Hardened Concrete Containing Treated Expanded Polystyrene Beads", Int. J. of Cement Composites, V 16, Dec. 1994, pp. 273-277.

Sri Ravindrarajah, R. and Sivapathasundaram, P., "Properties of Polystyrene Aggregate Concrete Having the Densities of 1300 and 1900 kg/m3", Journal of the Australian Ceramic Society, 1998, pp. 217-222.

Sri Ravindrarajah, R., "Bearing Strength of Concrete Containing Polystyrene Aggregate", Proceedings of the 8th RILEM Conference on the Durability of Building Materials & Components, Vancouver, Canada, 1999, pp. 505-514.

Sabaa, B.A., and Sri Ravindrarajah, R., "Investigation of Pull-Out Strength Between Polystyrene Aggregate Concrete and Reinforcing Steel", Proceedings of the Second International Symposium on Structural Lightweight Aggregate Concrete, Jun. 18-22, 2000, Kristiansand, Norway, pp. 729-736.

Sabaa, B.A., and Sri Ravindrarajah, R., "Impact Resistance of Polystyrene Aggregate Concrete With and Without Polypropylene Fibres", Proceedings of the Second International Symposium on Structural Lightweight Aggregate Concrete, Jun. 18-22, 2000, Kristiansand, Norway, pp. 719-728.

Naji, B., Sri Ravindrarajah, R. and Chung, H.W., "Flexural Behaviour of Ferrocement-Polystyrene Aggregate Concrete Composites", Proc. of the First Australasian Congress on Applied Mechanics, Feb. 21-23, 1996, Melbourne, Australia, pp. 351-356.

Naji, B., Sri Ravindrarajah, R. and Chung, H.W., "Impact-Echo Response in Ferrocement-Polystyrene Beaded Concrete Laminates", Proc. of the Int. Symp. on Non-Destructive Testing in Civil Engineering, Sep. 26-28, 1995, Berlin, Germany, pp. 503-511.

Dipl.-Ing. Thorsten et al., High Strength Lightweight-Aggregate Concrete; 2nd Int. PhD Symposium in Civil Engineering, 1998 Budapest. pp. 1-8.

"The Use of Stryocell B. Beads in Cellular Bricks, Plaster and Lightweight Concrete", Shell Chemicals Europe, Styrocell Bulletin, STY 1.4, Issued: Mar. 1998, 1st Edition, pp. 1-8.

ELFI Wall System, http//elfiwallsystem.com/index.htm, 2003.

Stoam Industries, Product brochure, at least earlier than Feb. 24, 2006.

Plastbau Technology—Insul-Deck, "Lightweight Forming System for Concrete Floors and Roofs", Product Brochure, Cat. No. 5M02,2002.

Sicilferro, "Tecnova-Tecnologie Costruttive", Product Catalog, at least earlier than Feb. 24, 2006.

US 8,048,219 B2

METHOD OF PLACING CONCRETE

REFERENCE TO RELATED APPLICATION

The present nonprovisional patent application is entitled to and claims the right of priority under 35 U.S.C. §119(e) of U.S. Provisional Patent Application Ser. No. 60/973,848 filed Sep. 20, 2007, which is hereby incorporated herein in its entirety by reference.

BACKGROUND OF THE INVENTION

1. Field of the Invention

The present invention is directed to novel methods of placing concrete compositions where the concrete does not develop undesirable properties when mixed for extended periods and/or pumped to an elevation above a concrete delivery point.

2. Description of the Prior Art

In the formulation of concrete compositions, it is known in the art to use mixtures of different hydraulic cements, as well as other additives such as accelerators and retarders in order to provide desirable properties such as slump, setting times, strengths, and volume changes in order to meet the needs or demands of various specialty applications.

Light weighting aggregates used in concrete compositions include expanded shale, clay and slate, and can range from the so-called "super light weights" which can be used in making concrete weighing 15 to 20 pounds per cubic foot to the natural aggregates and finally to the expanded shale, clay and slate aggregates which can produce structural concrete ranging from about 85 to 115 pounds per cubic foot when produced by the rotary kiln method and from about 90 to 120 pounds per cubic foot when produced by sintering. Structural light weight concrete is described as having a 28 day compressive strength of at least 2,500 pounds per square inch and an air dry weight of no more than 115 pounds per cubic foot. Weights can be increased by replacing a portion of the light weight aggregate with sand.

Other light weight aggregates used in concrete compositions are disclosed in U.S. Pat. No. 3,600,476 (light weight aggregates from fly ash and sludge); U.S. Pat. No. 3,661,604 (light weight aggregate mixture derived from clay, sand and crushed bricks); U.S. Pat. No. 4,504,320 (light weight aggregate containing fly ash, silica fume and microspheres); and U.S. Pat. No. 4,741,782 (light weight aggregate pellets from fly ash, cement and silica fume dust).

Often, when the above-described light weight aggregates are used in concrete formulations that are subsequently mixed for extended periods and/or pumped to an elevation above a concrete delivery point, the concrete formulation demonstrates a drop in fluidity often referred to as slump loss.

In many cases, dispersants are added to concrete formulations in an attempt to improving the fluidity of light weight concrete compositions. However, the water in the concrete composition tends to be adsorbed into the light weight aggregate during extended mixing and/or under the pressure generated during pumping resulting in a highly reduced water content resulting in slump loss, additionally, air is forced out of the concrete, the combination of which gives rise to the problems of poor workability and applicability.

Further, when dispersants are used to prevent slump loss, their ability to reduce the slump loss varies and becomes weaker with time and also causes significant and often undesirable set retardation.

U.S. Pat. Nos. 3,214,393, 3,257,338 and 3,272,765 disclose concrete mixtures that contain cement, a primary aggregate, particulate expanded styrene polymer, and a homogenizing and/or a surface-active additive.

U.S. Pat. No. 3,021,291 discloses a method of making cellular concrete by incorporating into the concrete mixture, prior to casting the mixture, a polymeric material that will expand under the influence of heat during curing. The shape and size of the polymeric particles is not critical.

U.S. Pat. No. 5,580,378 discloses a lightweight cementitious product made up of an aqueous concrete composition that can include fly ash, Portland cement, sand, lime and, as a weight saving component, micronized polystyrene particles having particle sizes in the range of 50 to 2000 μm and a density of about 1 lb/ft$^3$. The mixture can be poured into molded products such as foundation walls, roof tiles, bricks and the like. The product can also be used as a mason's mortar, a plaster, a stucco or a texture.

JP 9 071 449 discloses a lightweight concrete that includes Portland cement and a lightweight aggregate such as foamed polystyrene, perlite or vermiculite as a part or all parts of the aggregate. The foamed polystyrene has a granule diameter of 0.1-10 mm and a specific gravity of 0.01-0.08.

U.S. Pat. Nos. 5,580,378, 5,622,556, and 5,725,652 disclose lightweight cementitious products made up of an aqueous concrete composition that includes cement and expanded shale, clay, slate, fly ash, and/or lime, and a weight saving component, which is micronized polystyrene particles having particle sizes in the range of 50 to 2000 μm, and characterized by having water contents in the range of from about 0.5% to 50% v/v.

U.S. Pat. No. 4,265,964 discloses lightweight compositions for structural units such as wallboard panels and the like, which contain low density expandable thermoplastic granules; a cementitious base material, such as, gypsum; a surfactant; an additive which acts as a frothing agent to incorporate an appropriate amount of air into the mixture; a film forming component; and a starch. The expandable thermoplastic granules are expanded as fully as possible.

WO 98 02 397 discloses lightweight-concrete roofing tiles made by molding a hydraulic binder composition containing synthetic resin foams as the aggregate and having a specific gravity of about 1.6 to 2.

WO 00/61519 discloses a lightweight concrete that includes a blend of from around 40% to 99% of organic polymeric material and from 1% to around 60% of an air entraining agent. The blend is used for preparing lightweight concrete that uses polystyrene aggregate. The blend is required to disperse the polystyrene aggregate and to improve the bond between the polystyrene aggregate and surrounding cementitious binder.

WO 01/66485 discloses a lightweight concrete composition containing by volume: 5 to 80% cement, 10 to 65% expanded polystyrene particles; 10 to 90% expanded mineral particles; and water sufficient to make a paste with a substantially even distribution of expanded polystyrene after proper mixing.

U.S. Pat. No. 6,851,235 discloses a building block that includes a mixture of water, cement, and expanded polystyrene (EPS) foam beads that have a diameter from 3.18 mm (⅛ inch) to 9.53 mm (⅜ inch) in the proportions of from 68 to 95 liters (18 to 25 gallons) water; from 150 to 190 kg (325 to 425 lb) cement; and from 850 to 1400 liters (30 to 50 cubic feet) prepuff beads.

U.S. Pat. No. 5,913,791 discloses a building block that has a cement-based attachment layer on one or both exterior surfaces of the block that receives and holds a penetrating fastener such as a nail, screw, staple, or the like. One cement-based layer contains water, cement, and expanded polystyrene foam beads in first proportions and a second exterior surface contains water, cement, and expanded polystyrene foam beads in second proportions different than the first proportions.

In many cases, water is able to adsorb or absorb into and/or onto the expanded polystyrene particles leading to a highly reduced water content in the concrete composition, slump loss, poor workability and applicability after extended mixing and/or under the pressure generated during pumping as described above.

In many situations where expanded polystyrene particles are used in concrete formulations, the expanded polystyrene particles lower the strength and/or structural integrity of concrete compositions. Further, concrete articles made from prior art expanded polystyrene particles have at best inconsistent physical properties, such as Young's modulus, thermal conductivity, and compressive strength, and typically demonstrate less than desirable physical properties.

Thus, there is a need in the art to provide methods for light weighting concrete that do not result in slump loss and set retardation.

SUMMARY OF THE INVENTION

The present invention provides a method of placing a light weighted concrete compositions, the method includes the steps of a) combining ingredients comprising 3-40 volume percent cement, 5-50 volume percent fine aggregate, 5-50 volume percent coarse aggregate, and 10-22 volume percent water to form a concrete mixture; b) during or after (a), adding 1.5-40 volume percent of prepuff particles to the concrete mixture to form a light weighted concrete composition; and c) pumping the light weighted concrete composition to a point higher in elevation than the delivery point of the concrete to place the concrete. The light weighted concrete composition contains less than 30 volume percent of other light weighting aggregates and the prepuff particles have an average particle diameter of from 0.2 mm to 8 mm, a bulk density of from 0.02 g/cc to 0.64 g/cc, an aspect ratio of from 1 to 3. The slump value of the placed light weighted concrete composition measured according to ASTM C 143 is greater than 1 inch and the light weighted concrete composition has a density of from about 40 to about 135 lb./ft$^3$.

DETAILED DESCRIPTION OF THE INVENTION

Figure 2:
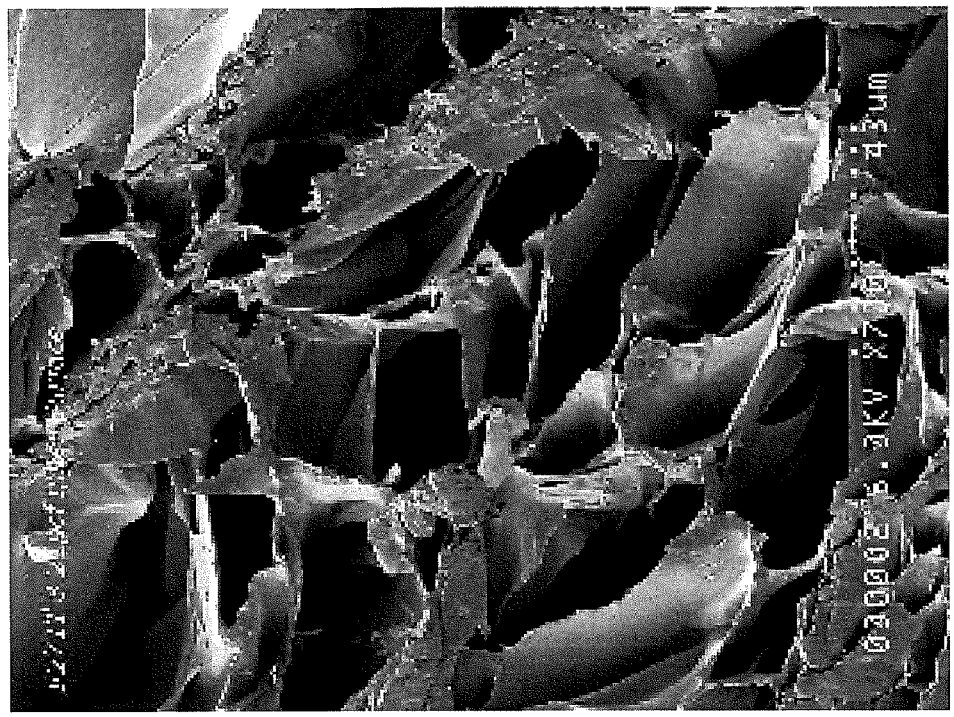
FIG. 2 is a scanning electron micrograph of the interior of a prepuff bead used in the invention.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "particles containing void spaces" refer to expanded polymer particles, prepuff particles, and other particles that include cellular and/or honeycomb-type chambers at least some of which are completely enclosed, that contain air or a specific gas or combination of gasses, as a non-limiting example prepuff particles as described herein.

As used herein, the term "prepuff particles" refers to expanded polymer particles that have been expanded, but not to their maximum expansion factor.

As used herein, the term "expansion factor" refers to the volume a given weight of expanded polymer bead occupies, typically expressed as cc/g, and in the present invention, typically a value of up to 50 cc/g.

As used herein the terms "cement" and "cementitious" refer to materials that bond a concrete or other monolithic product, not the final product itself. In particular, hydraulic cement refers to a material that sets and hardens by undergoing a hydration reaction in the presence of a sufficient quantity of water to produce a final hardened product.

As used herein, the terms "supplementary cementitious material" or "pozzolan" refer to a siliceous or siliceous and aluminous material, which in itself possesses little or no cementitious value, but which will in finely divided form and in the presence of moisture, chemically react with calcium hydroxide at ordinary temperatures to form compounds possessing cementitious properties. Non-limiting examples of supplementary cementitious materials or pozzolans include fly ash (C and F), silica fume, micronized silica, volcanic ashes, calcined clay, metakaolin clay and ground granulated blast furnace slag.

As used herein, the term "concrete composition" refers to a composition that includes a cement material, and one or more fillers, adjuvants, or other aggregates and/or materials known in the art that form a slurry that hardens upon curing. Cement materials include, but are not limited to, hydraulic cement, gypsum, gypsum compositions, lime and the like and may or may not include water. Adjuvants and fillers include, but are not limited to sand, clay, fly ash, aggregate, air entrainment agents, colorants, water reducers/superplasticizers, and the like.

As used herein, the term "concrete" refers to a hard strong building material made by mixing a concrete composition with sufficient water to cause the concrete composition to set and bind the entire mass.

As used herein, the term "ready mix" refers to concrete that is batched for delivery from a central plant instead of being mixed on a job site. Typically, a batch of ready mix is tailor-made according to the specifics of a particular construction project and delivered in a plastic condition, usually in cylindrical trucks often referred to as "cement mixers".

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

As used herein, the terms "(meth)acrylic" and "(meth) acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "polymer" is meant to encompass, without limitation, homopolymers, copolymers, graft copolymers, and blends and combinations thereof.

The present invention provides methods of placing a light weighted concrete composition. The methods include the steps of:
  a) combining ingredients comprising 3-40 volume percent cement, 5-50 volume percent fine aggregate, 5-50 volume percent coarse aggregate, and 10-22 volume percent water to form a concrete mixture;
  b) during or after (a), adding 1.5-40 volume percent of prepuff particles to the concrete mixture to form a light weighted concrete composition; and
  c) pumping the light weighted concrete composition to a point higher in elevation than the delivery point of the concrete to place the concrete.

In the present inventions, the light weighted concrete composition contains less than 30 volume percent of other light weighting aggregates; the prepuff particles have an average particle diameter of from 0.2 mm to 8 mm, a bulk density of from 0.02 g/cc to 0.64 g/cc, an aspect ratio of from 1 to 3; the slump value of the placed light weighted concrete composition measured according to ASTM C 143 is greater than 1 inch; and the light weighted concrete composition has a density of from about 40 to about 135 lb./ft$^3$.

As used herein, the terms "light weighted concrete" and "light weight concrete" refer to concrete compositions, where one or more light weighting admixtures (including prepuff particles and/or light weight aggregates are added to the composition such that the density of the concrete composition is less than 140 lb./ft$^3$ (a minimum density typically found with "standard" weight concrete).

In an embodiment of the invention, the cement includes a hydraulic cement composition. The hydraulic cement composition can be present at a level of at least 3, in certain situations at least 5, in some cases at least 8, and in other cases at least 9 volume percent and can be present at levels up to 40, in some cases up to 35, in other cases up to 30, and in some instances up to 20 volume percent of the concrete composition mixture. The concrete composition can include the hydraulic cement composition at any of the above-stated levels or at levels ranging between any of levels stated above.

In a particular embodiment of the invention, the hydraulic cement composition can be one or more materials selected from Portland cements, pozzolana cements, gypsum cements, aluminous cements, magnesia cements, silica cements, and slag cements. Further, various cement types as defined in ASTM C150 can be used in the invention, non-limiting examples of which include Type I (for use when the special properties of other cement types are not required), Type IA (for air-entraining cement of Type I quality), Type II (for general use when moderate sulfate resistance or moderate heat of hydration is desired), Type IIA (for air-entraining cement of Type II quality), Type III (for use when high early strength is desired), Type IIIA (for air-entraining cement of Type III quality), and Type IV (for use when a low heat of hydration is desired), Type V (for use when high sulfate resistance is desired).

In a particular embodiment of the invention the cement composition is type I Portland cement.

The concrete compositions used in the present method include fine aggregate, a non-limiting example of such being sand. In embodiments of the invention, the fine aggregate can be characterized as having a "fineness modulus" or "FM" of less than 4, in some cases less than 3.5, in other cases less than 3, in some instances less than 2.5 and in other instances less than 2.

In some embodiments of the invention, the strength of the concrete made using the present method increases when fine aggregate with an FM of less than 2 is used in the concrete composition. In these embodiment of the invention, all or a portion of the sand or other fine aggregate used in the concrete composition of the present method has a fineness modulus of less than 2, in some cases less than 1.9 and in other cases less than 1.8.

In other embodiments of the invention, it is advantageous to use a bimodal fine aggregate or sand such that a portion has an FM of between 2 and 4 ("High FM") and another portion has an FM of less than 2 ("Low FM"). In these embodiments, the weight ratio of High FM to Low FM fine aggregate or sand can be up to 90:10, in some cases up to 75:25 and in other cases up to 60:40 and can be 50:50, additionally, the ratio can be as low as 10:90, in some cases as low as 25:75 and in other cases as low as 40:60. The High FM to Low FM fine aggregate ratio can be any value or range between any of the values recited above.

As used herein, "fineness modulus" or "FM" refers to an empirical factor that gives a relative measure of the proportions of fine and coarse particles in an aggregate. FM is a value used to indicate the relative fineness or coarseness of a fine aggregate and can be determined according to ASTM C 117. Although ASTM C 117 can be consulted for precise details, and is incorporated by reference herein in its entirety, it can be summarized as follows. The FM is obtained by sieving a 500-gram sample of sand through a series of standard sieves (Nos. 4, 8, 16, 30, 50, and 100). The weight retained on each sieve is converted into a cumulative percentage retained, starting with the No. 4 sieve. The sum of the six percentages is divided by 100. The resulting answer is the fineness modulus.

In a the concrete composition of the present method, the sand and/or other fine aggregate can make up at least 10, in some cases at least 15, in other cases at least 20 volume percent of the concrete composition of the present method. Further, sand and/or other fine aggregate can provide up to 50, in some cases up to 45, in other cases up to 40, and in some instances up to 35 volume percent of the concrete composition of the present method. The amount of sand and/or other fine aggregate is adjusted to provide desired properties to the concrete composition of the present method. The amount of sand and/or other fine aggregate can be any value or range between any of the values recited above.

The concrete compositions of the present method can include coarse aggregate (aggregate having an FM value of greater than 4). In embodiments of the invention, the coarse aggregate can have a diameter of from at least about 0.375 inches (0.95 cm), in some cases about 0.5 inches (1.3 cm), in other cases about 0.75 inches (1.9 cm) to up to about 2 inches (5 cm). The coarse aggregate can include stone, non-limiting examples of which include river rock, limestone, granite, sandstone, brownstone, conglomerate, calcite, dolomite, serpentine, travertine, slate, bluestone, gneiss, quarizitic sandstone, quartzite and combinations thereof.

The coarse aggregate can be included concrete composition of the present method at a level of at least 1, in some cases at least 5, and in other cases at least 10 volume percent of the concrete composition. Further, coarse aggregate can provide up to 50, in some cases up to 40, in other cases up to 30, and in some instances up to 25 volume percent of the concrete composition of the present method. The amount of coarse aggregate is adjusted to provide desired properties to the concrete composition of the present method. The amount of coarse aggregate in the concrete composition of the present method can be any value or range between any of the values recited above.

The concrete composition of the present method contains water, at from at least about 10 volume percent, in some cases at least about 14 volume percent up to about 22 volume percent, in some cases up to about 20 volume percent and in other cases up to about 18 volume percent. The amount of water in the concrete composition of the present method can be any value or range between any of the values recited above.

In embodiments of the invention, the water to cement ratio in the concrete composition of the present method can be greater than 0.3, in some cases greater than 0.35 and in other cases greater than 0.4.

The expanded polymer or prepuff particles are present in the concrete composition of the present method at a level of at least 1.5, in some cases at least 2, in other cases at least 2.5, in particular cases at least 5, in some instances at least 10, and in other instances at least 15 volume percent and up to 40, in some cases up to 35, in other cases up to 30, and in some instances up to 25 volume percent based on the total volume of the concrete composition of the present method. The amount of expanded polymer particles will vary depending on the particular physical properties desired in a finished concrete article. The amount of expanded polymer particles in the concrete composition of the present method can be any value or can range between any of the values recited above.

The expanded polymer particles can include any particles derived from any suitable expandable thermoplastic material. The actual polymer particles are selected based on the particular physical properties desired in a finished concrete article. As a non-limiting example, the polymer particles, which can optionally be expanded polymer particles, can include one or more polymers selected from homopolymers of vinyl aromatic monomers; copolymers of at least one vinyl aromatic monomer with one or more of divinylbenzene, conjugated dienes, alkyl methacrylates, alkyl acrylates, acrylonitrile, and/or maleic anhydride; polyolefins; polycarbonates; polyesters; polyamides; natural rubbers; synthetic rubbers; and combinations thereof.

In an embodiment of the invention, the polymer particles include thermoplastic homopolymers or copolymers selected from homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer as described above with one or more other monomers, non-limiting examples being divinylbenzene, conjugated dienes (non-limiting examples being butadiene, isoprene, 1,3- and 2,4-hexadiene), alkyl methacrylates, alkyl acrylates, acrylonitrile, and maleic anhydride, wherein the vinyl aromatic monomer is present in at least 50% by weight of the copolymer. In an embodiment of the invention, styrenic polymers are used, particularly polystyrene. However, other suitable polymers can be used, such as polyolefins (e.g. polyethylene, polypropylene), polycarbonates, polyphenylene oxides, and mixtures thereof.

In a particular embodiment of the invention, the expanded polymer particles are expanded polystyrene (EPS) particles. These particles can be in the form of beads, granules, or other particles convenient for expansion and molding operations.

In embodiments of the present invention, particles are formed via polymerization in a suspension process, which are essentially spherical resin beads. These beads can be used to form expanded polymer particles. However, polymers derived from solution and bulk polymerization techniques that are extruded and cut into particle sized resin bead sections can also be used.

In an embodiment of the invention, resin beads (unexpanded) containing any of the polymers or polymer compositions described herein have a particle size of at least 0.2, in some situations at least 0.33, in some cases at least 0.35, in other cases at least 0.4, in some instances at least 0.45 and in other instances at least 0.5 mm. Also, the resin beads can have a particle size of up to 3, in some instances up to 2, in other instances up to 2.5, in some cases up to 2.25, in other cases up to 2, in some situations up to 1.5 and in other situations up to 1 mm. In this embodiment, the physical properties of concrete articles made according to the present method have inconsistent or undesirable physical properties when resin beads having particle sizes outside of the above described ranges are used to make the expanded polymer particles. The resin beads used in this embodiment can be any value or can range between any of the values recited above.

The expandable thermoplastic particles or resin beads can be impregnated using any conventional method with a suitable blowing agent. As a non-limiting example, the impregnation can be achieved by adding the blowing agent to the aqueous suspension during the polymerization of the polymer, or alternatively by re-suspending the polymer particles in an aqueous medium and then incorporating the blowing agent as taught in U.S. Pat. No. 2,983,692. Any gaseous material or material which will produce gases on heating can be used as the blowing agent. Conventional blowing agents include aliphatic hydrocarbons containing 4 to 6 carbon atoms in the molecule, such as butanes, pentanes, hexanes, and the halogenated hydrocarbons, e.g., CFC's and HCFC's, which boil at a temperature below the softening point of the polymer chosen. Mixtures of these aliphatic hydrocarbon blowing agents can also be used.

Alternatively, water can be blended with these aliphatic hydrocarbons blowing agents or water can be used as the sole blowing agent as taught in U.S. Pat. Nos. 6,127,439; 6,160,027; and 6,242,540 in these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

The impregnated polymer particles or resin beads are expanded to a bulk density of at least 1.25 lb/ft³ (0.02 g/cc), in some cases 1.75 lb/ft³ (0.028 g/cc), in some circumstances at least 2 lb/ft³ (0.032 g/cc) in other circumstances at least 3 lb/ft³ (0.048 g/cc) and in particular circumstances at least 3.25 lb/ft³ (0.052 g/cc) or 3.5 lb/ft³ (0.056 g/cc). The bulk density can be as high as 40 lb/ft³ (0.64 g/cc), and when the polymer particles are at least partially expanded the bulk density can be up to 35 lb/ft³ (0.56 g/cc), in some cases up to 30 lb/ft³ (0.48 g/cc), in other cases up to 25 lb/ft³ (0.4 g/cc), in some instances up to 20 lb/ft³ (0.32 g/cc), in other instances up to 15 lb/ft³ (0.24 g/cc) and in certain circumstances up to 10 lb/ft³ (0.16 g/cc). The bulk density of the polymer particles can be any value or range between any of the values recited above. The bulk density of the expanded polymer particles and/or prepuff particles is determined by weighing a known volume of polymer particles, beads and/or prepuff particles (aged 24 hours at ambient conditions).

The expansion step is conventionally carried out by heating the impregnated beads via any conventional heating medium, such as steam, hot air, hot water, or radiant heat. One generally accepted method for accomplishing the pre-expansion of impregnated thermoplastic particles is taught in U.S. Pat. No. 3,023,175.

The expanded polymer particles can be foamed cellular polymer particles as taught in U.S. Patent Application Publication No. 2002/0117769, the teachings of which are incorporated herein by reference. The foamed cellular particles can be polystyrene that are expanded and contain a volatile blowing agent at a level of less than 14 wt %, in some situations less than 6 wt %, in some cases ranging from about 2 wt % to about 5 wt %, and in other cases ranging from about 2.5 wt % to about 3.5 wt % based on the weight of the polymer.

An interpolymer of a polyolefin and in situ polymerized vinyl aromatic monomers that can be included in the expanded thermoplastic resin or polymer particles according to the invention is disclosed in U.S. Pat. Nos. 4,303,756, 4,303,757 and 6,908,949, the relevant portions of which are herein incorporated by reference.

The polymer particles can include customary ingredients and additives, such as flame retardants, pigments, dyes, colorants, plasticizers, mold release agents, stabilizers, ultraviolet light absorbers, mold prevention agents, antioxidants, rodenticides, insect repellants, and so on. Typical pigments include, without limitation, inorganic pigments such as carbon black, graphite, expandable graphite, zinc oxide, titanium dioxide, and iron oxide, as well as organic pigments such as quinacridone reds and violets and copper phthalocyanine blues and greens.

In a particular embodiment of the invention the pigment is carbon black, a non-limiting example of such a material being EPS SILVER® resin, available from NOVA Chemicals Inc.

In another particular embodiment of the invention the pigment is graphite, a non-limiting example of such a material being NEOPOR® resin available from BASF Aktiengesellschaft Corp., Ludwigshafen am Rhein, Germany.

When materials such as carbon black and/or graphite are included in the polymer particles, improved insulating properties, as exemplified by higher R values for materials containing carbon black or graphite (as determined using ASTM-C518), are provided. As such, the R value of the expanded polymer particles containing carbon black and/or graphite or materials made from such polymer particles are at least 5% higher than observed for particles or resulting articles that do not contain carbon black and/or graphite.

The expanded polymer particles or prepuff particles can have an average particle size (diameter) of at least 0.2, in some circumstances at least 0.3, in other circumstances at least 0.5, in some cases at least 0.75, in other cases at least 0.9 and in some instances at least 1 mm and can be up to 8, in some circumstances up to 6, in other circumstances up to 5, in some cases up to 4, in other cases up to 3, in some instances up to 2.5 and in other instances up to about 2 mm. When the size of the expanded polymer particles or prepuff particles are too small or too large, the physical properties of concrete articles made using the concrete composition of the present method can be undesirable. The average particle size of the expanded polymer particles or prepuff particles can be any value and can range between any of the values recited above. The average particle size of the expanded polymer particles or prepuff particles can be determined using laser diffraction techniques or by screening according to mesh size using mechanical separation methods well known in the art.

In an embodiment of the invention, the polymer particles or expanded polymer particles have a minimum average cell wall thickness, which helps to provide desirable physical properties to concrete articles made using the present concrete composition. The average cell wall thickness and inner cellular dimensions can be determined using scanning electron microscopy techniques known in the art. The expanded polymer particles can have an average cell wall thickness of at least 0.15 μm, in some cases at least 0.2 μm and in other cases at least 0.25 μm. Not wishing to be bound to any particular theory, it is believed that a desirable average cell wall thickness results when resin beads having the above-described dimensions are expanded to the above-described densities.

In an embodiment of the invention, the polymer beads are expanded to form the expanded polymer particles such that a desirable cell wall thickness as described above is achieved. Though many variables can impact the wall thickness, it is desirable, in this embodiment, to limit the expansion of the polymer bead so as to achieve a desired wall thickness and resulting expanded polymer particle strength. Optimizing processing steps and blowing agents can expand the polymer beads to a minimum of 1.25 lb/ft³ (0.02 g/cc). This property of the expanded polymer bulk density, can be described by pcf (lb/ft³) or by an expansion factor (cc/g).

In order to provide expanded polymer particles with desirable cell wall thickness and strength, the expanded polymer particles are not expanded to their maximum expansion factor; as such an extreme expansion yields particles with undesirably thin cell walls and insufficient strength. Further, the polymer beads can be expanded at least 5%, in some cases at least 10%, and in other cases at least 15% of their maximum expansion factor. However, so as not to cause the cell wall thickness to be too thin, the polymer beads are expanded up to 80%, in some cases up to 75%, in other cases up to 70%, in some instances up to 65%, in other instances up to 60%, in some circumstances up to 55%, and in other circumstances up to 50% of their maximum expansion factor. The polymer beads can be expanded to any degree indicated above or the expansion can range between any of the values recited above. Typically, the prepuff particles do not further expand when formulated into the concrete compositions of the present method and do not further expand while the concrete compositions set, cure and/or harden.

In embodiments of the invention, the prepuff particles can have an expansion factor of at least 10 and in some cases at least 12 cc/g and can be up to 70, in some cases up to 60 cc/g and in other cases up to 50 cc/g. The expansion factor of the prepuff particles can be any value or range between any of the values recited above.

Figure 1:
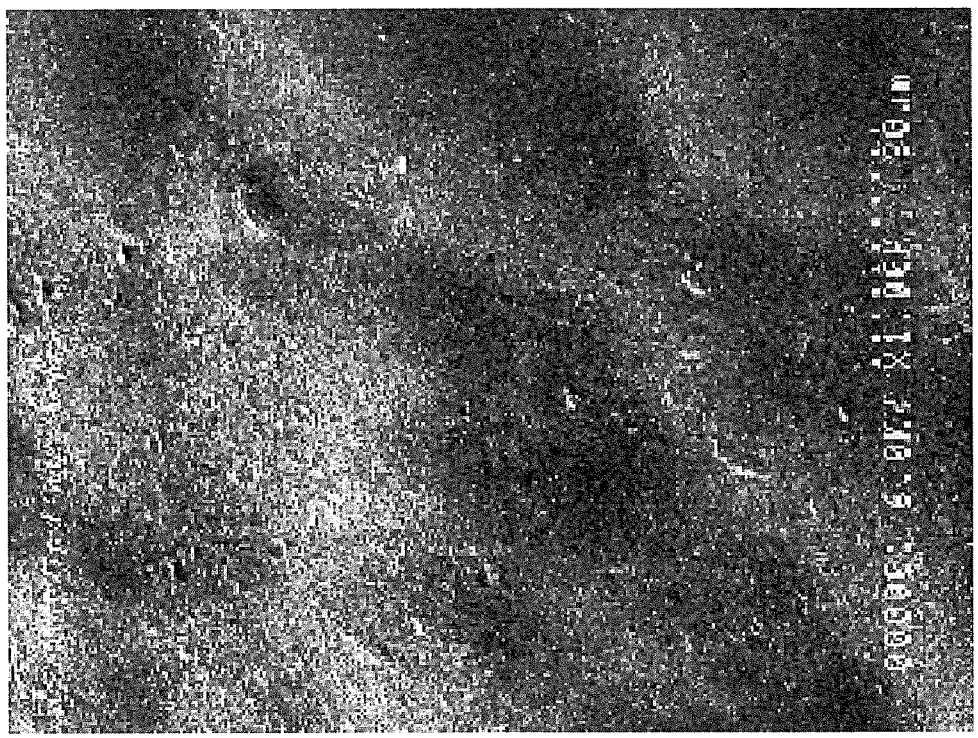
FIG. 1 is a scanning electron micrograph of the surface of a prepuff bead used in the invention.
Figure 4:
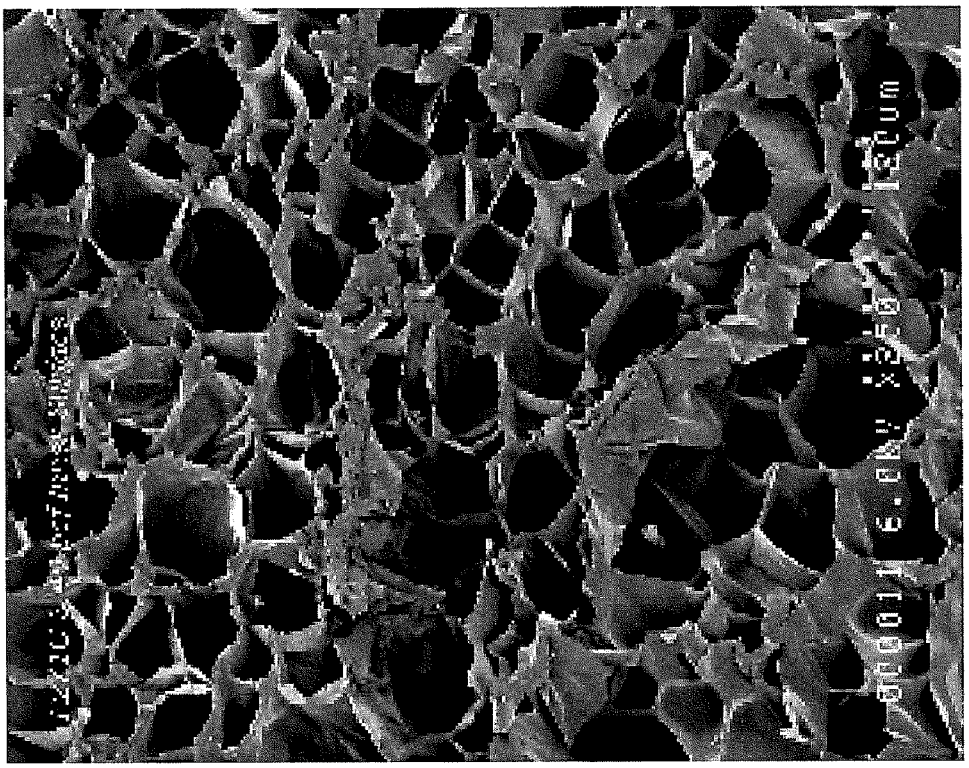
FIG. 4 is a scanning electron micrograph of the interior of a prepuff bead used in the invention.
Figure 3:
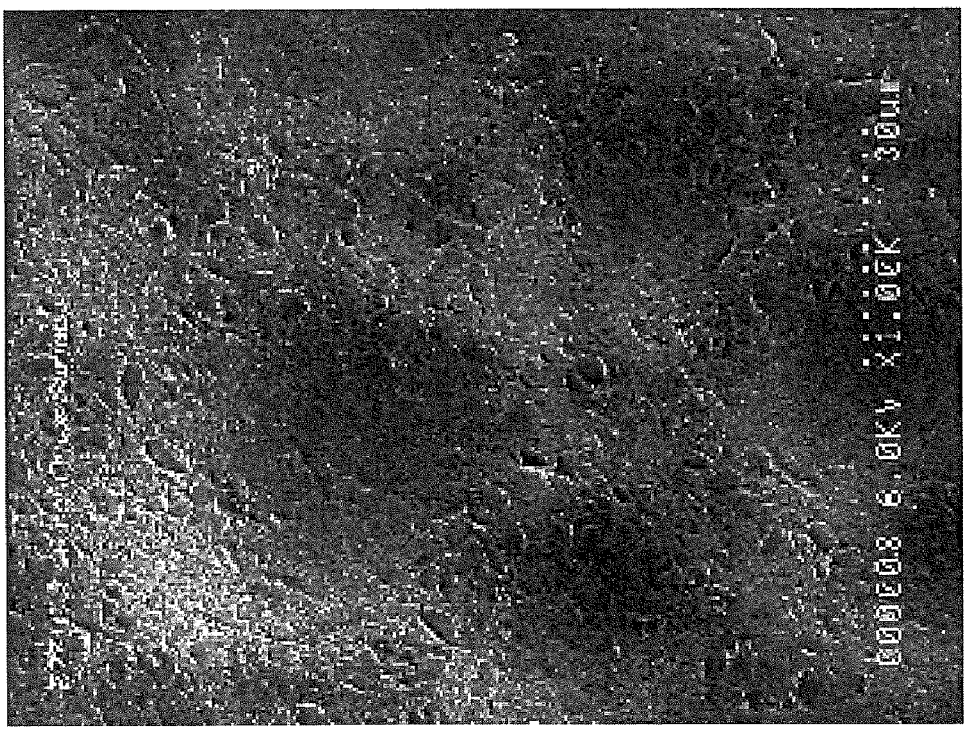
FIG. 3 is a scanning electron micrograph of the surface of a prepuff bead used in the invention.
Figure 6:
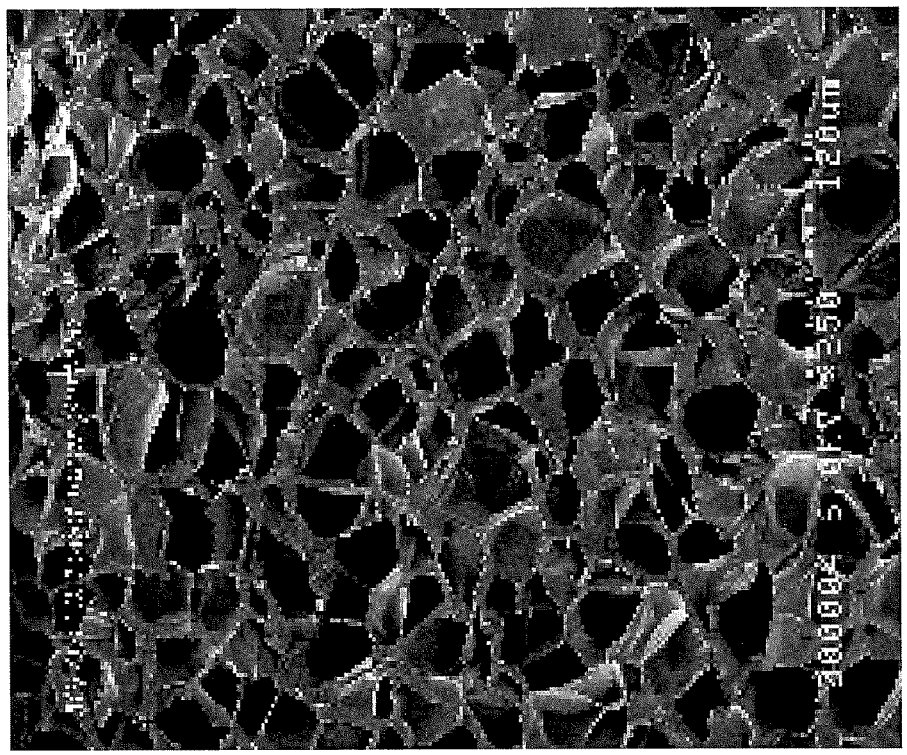
FIG. 6 is a scanning electron micrograph of the interior of a prepuff bead used in the invention.
Figure 5:
FIG. 5 is a scanning electron micrograph of the surface of a prepuff bead used in the invention.

The prepuff or expanded polymer particles typically have a cellular structure or honeycomb interior portion and a generally smooth continuous polymeric surface as an outer surface, i.e., a substantially continuous outer layer. The smooth continuous surface can be observed using scanning electron microscope (SEM) techniques at 1000× magnification. SEM observations do not indicate the presence of holes in the outer surface of the prepuff or expanded polymer particles, as shown in FIGS. 1, 3 and 5. Cutting sections of the prepuff or expanded polymer particles and taking SEM observations reveals the generally honeycomb structure of the interior of the prepuff or expanded polymer particles, as shown in FIGS. 2, 4 and 6.

The substantially continuous outer layer of the prepuff particles used in the present method provide a key feature in the present method. Conventional light weighting aggregates and in many cases EPS particles used in the prior art adsorbed and/or absorbed water from concrete formulations during pumping and or extended mixing operations resulting in slump loss, a concrete composition that was difficult or impossible to place and finish, and in some cases pump failure resulting in the concrete not being placed. The substantially continuous outer layer of the prepuff particles used in the present method minimizes adsorbed and/or absorbed water from the concrete compositions of the present method, avoiding the problems associated with the prior art use of conventional light weighting aggregates and in many cases EPS particles in pumping and extended mixing operations.

The polymer particles or expanded polymer particles can have any cross-sectional shape that allows for providing desirable physical properties in concrete articles. In an embodiment of the invention, the expanded polymer particles have a circular, oval or elliptical cross-section shape. In embodiments of the invention, the prepuff or expanded polymer particles have an aspect ratio of 1, in some cases at least 1 and the aspect ratio can be up to 3, in some cases up to 2 and in other cases up to 1.5. The aspect ratio of the prepuff or expanded polymer particles can be any value or range between any of the values recited above.

Traditional light weighting aggregates can be included in the concrete compositions of the present method, however, the amount of such aggregates is limited based on the slump loss properties they cause in the concrete composition after pumping and/or extended mixing. Non-limiting examples of light weighting aggregates that can be used in this regard include glass, expanded slate and clay; insulating aggregates such as pumice, perlite, vermiculite, scoria, and diatomite; concrete aggregate such as expanded shale, expanded slate, expanded clay, expanded slag, pelletized aggregate, extruded fly ash, tuff, and macrolite; and masonry aggregate such as expanded shale, clay, slate, expanded blast furnace slag, sintered fly ash, coal cinders, pumice, scoria, pelletized aggregate and combinations thereof.

The other light weighting aggregates can optionally be present in the concrete compositions of the present method at up to 30, in some situations up to 20, in other situations up to 10, in some cases up to 8, in other cases up to 7, in some instances up to 5 and in other instances up to 3 volume percent of the concrete composition.

In embodiments of the invention, supplementary cementitious materials can optionally be included in the present concrete compositions. When supplementary cementitious materials are used, they can be included at a level of up to 30, in some situations up to 20, in other situations up to 10, in some cases up to 8, in other cases up to 7, in some instances up to 5 and in other instances up to 3 volume percent of the concrete composition.

In an embodiment of the invention, the concrete composition can optionally include other aggregates and adjuvants known in the art including but not limited to additional aggregate, plasticizers and/or fibers. Suitable fibers include, but are not limited to glass fibers, silicon carbide, aramid fibers, polyester, carbon fibers, composite fibers, fiberglass, and combinations thereof as well as fabric containing the above-mentioned fibers, and fabric containing combinations of the above-mentioned fibers.

Non-limiting examples of fibers that can be used in the invention include MeC-GRID® and C-GRID® available from TechFab, LLC, Anderson, S.C., KEVLAR® available from E.I. du Pont de Nemours and Company, Wilmington, Del., TWARON® available from Teijin Twaron B.V., Arnheim, the Netherlands, SPECTRA® available from Honeywell International Inc., Morristown, N.J., DACRON® available from Invista North America S.A.R.L. Corp. Wilmington, Del., and VECTRAN® available from Hoechst Cellanese Corp., New York, N.Y. The fibers can be used in a mesh structure, intertwined, interwoven, and oriented in any desirable direction.

In a particular embodiment of the invention fibers can make up at least 0.1, in some cases at least 0.5, in other cases at least 1, and in some instances at least 2 volume percent of the concrete composition. Further, fibers can provide up to 10, in some cases up to 8, in other cases up to 7, and in some instances up to 5 volume percent of the concrete composition. The amount of fibers is adjusted to provide desired properties to the concrete composition. The amount of fibers can be any value or range between any of the values recited above.

In embodiments of the invention, the lightweight concrete compositions can contain one or more additives, non-limiting examples of such being anti-foam agents, water-proofing agents, dispersing agents, set-accelerators, set-retarders, plasticizing agents, superplasticizing agents, water reducers, bonding agents, freezing point decreasing agents, adhesiveness-improving agents, and colorants. The additives are typically present at less than one percent by weight with respect to total weight of the composition, but can be present at from 0.1 to 3 weight percent.

Suitable dispersing agents or plasticizers that can be used in the invention include, but are not limited to hexametaphosphate, tripolyphosphate, polynaphthalene sulphonate, sulphonated polyamine and combinations thereof.

Suitable plasticizing agents that can be used in the invention include, but are not limited to polyhydroxycarboxylic acids or salts thereof, polycarboxylates or salts thereof; lignosulfonates, polyethylene glycols, and combinations thereof.

Suitable superplasticizing agents that can be used in the invention include, but are not limited to alkaline or earth alkaline metal salts of lignin sulfonates; lignosulfonates, alkaline or earth alkaline metal salts of highly condensed naphthalene sulfonic acid/formaldehyde condensates; polynaphthalene sulfonates, alkaline or earth alkaline metal salts of one or more polycarboxylates (such as poly(meth) acrylates and the polycarboxylate comb copolymers described in U.S. Pat. No. 6,800,129, the relevant portions of which are herein incorporated by reference); alkaline or earth alkaline metal salts of melamine/formaldehyde/sulfite condensates; sulfonic acid esters; carbohydrate esters; and combinations thereof.

Non-limiting examples of suitable water reducers include lignosulfonates, sodium naphthalene sulfonate formaldehyde condensates, sulfonated melamine-formaldehyde resins, sulfonated vinylcopolymers, urea resins, and salts of hydroxy- or polyhydroxy-carboxylic acids, a 90/10 w/w mixture of polymers of the sodium salt of naphthalene sulfonic acid partially condensed with formaldehyde and sodium gluconate as described in U.S. Pat. No. 3,686,133, and combinations thereof.

Examples of suitable bonding agents include materials that can be either inorganic or organic and are soft and workable when fresh but set to form a hard, infusible solid on curing, either by hydraulic action or by chemical crosslinking. Non-limiting examples of such materials can include organic materials such as rubber, polyvinyl chloride, polyvinyl acetate, acrylics, styrene butadiene copolymers, and various powdered polymers.

Suitable set-accelerators that can be used in the invention include, but are not limited to soluble chloride salts (such as calcium chloride), triethanolamine, paraformaldehyde, soluble formate salts (such as calcium formate), sodium hydroxide, potassium hydroxide, sodium carbonate, sodium sulfate, $12CaO.7Al_2O_3$, sodium sulfate, aluminum sulfate, iron sulfate, the alkali metal nitrate/sulfonated aromatic hydrocarbon aliphatic aldehyde condensates disclosed in U.S. Pat. No. 4,026,723, the water soluble surfactant accelerators disclosed in U.S. Pat. No. 4,298,394, the methylol derivatives of amino acids accelerators disclosed in U.S. Pat. No. 5,211,751, and the mixtures of thiocyanic acid salts, alkanolamines, and nitric acid salts disclosed in U.S. Pat. No. Re. 35,194, the relevant portions of which are herein incorporated by reference, and combinations thereof.

Suitable set-retarders that can be used in the invention include, but are not limited to lignosulfonates, hydroxycarboxylic acids (such as gluconic acid, citric acid, tartaric acid, maleic acid, salicylic acid, glucoheptonic acid, arabonic acid, acid, and inorganic or organic salts thereof such as sodium, potassium, calcium, magnesium, ammonium and triethanolamine salt), cardonic acid, sugars, modified sugars, phosphates, borates, silico-fluorides, calcium bromate, calcium sulfate, sodium sulfate, monosaccharides such as glucose, fructose, galactose, saccharose, xylose, apiose, ribose and invert sugar, oligosaccharides such as disaccharides and trisaccharides, such oligosaccharides as dextrin, polysaccharides such as dextran, and other saccharides such as molasses containing these; sugar alcohols such as sorbitol; magnesium silicofluoride; phosphoric acid and salts thereof, or borate esters; aminocarboxylic acids and salts thereof; alkali-soluble proteins; humic acid; tannic acid; phenols; polyhydric alcohols such as glycerol; phosphonic acids and derivatives thereof, such as aminotri(methylenephosphonic acid), 1-hydroxyethylidene-1,1-diphosphonic acid, ethylenediaminetetra(methylene-phosphonic acid), diethylenetriaminepenta (methylenephosphonic acid), and alkali metal or alkaline earth metal salts thereof, and combinations of the set-retarders indicated above.

Suitable defoaming agents that can be used in the invention include, but are not limited to silicone-based defoaming agents (such as dimethylpolysiloxane, dimethylsilicone oil, silicone paste, silicone emulsions, organic group-modified polysiloxanes (polyorganosiloxanes such as dimethylpolysiloxane), fluorosilicone oils, etc.), alkyl phosphates (such as tributyl phosphate, sodium octylphosphate, etc.), mineral oil-based defoaming agents (such as kerosene, liquid paraffin, etc.), fat- or oil-based defoaming agents (such as animal or vegetable oils, sesame oil, castor oil, alkylene oxide adducts derived therefrom, etc.), fatty acid-based defoaming agents (such as oleic acid, stearic acid, and alkylene oxide adducts derived therefrom, etc.), fatty acid ester-based defoaming agents (such as glycerol monoricinolate, alkenylsuccinic acid derivatives, sorbitol monolaurate, sorbitol trioleate, natural waxes, etc.), oxyalkylene type defoaming agents, alcohol-based defoaming agents: octyl alcohol, hexadecyl alcohol, acetylene alcohols, glycols, etc.), amide-based defoaming agents (such as acrylate polyamines, etc.), metal salt-based defoaming agents (such as aluminum stearate, calcium oleate, etc.) and combinations of the above-described defoaming agents.

Suitable freezing point decreasing agents that can be used in the invention include, but are not limited to ethyl alcohol, calcium chloride, potassium chloride, and combinations thereof.

Suitable adhesiveness-improving agents that can be used in the invention include, but are not limited to polyvinyl acetate, styrene-butadiene, homopolymers and copolymers of (meth) acrylate esters, and combinations thereof.

Suitable water-repellent or water-proofing agents that can be used in the invention include, but are not limited to fatty acids (such as stearic acid or oleic acid), lower alkyl fatty acid esters (such as butyl stearate), fatty acid salts (such as calcium or aluminum stearate), silicones, wax emulsions, hydrocarbon resins, bitumen, fats and oils, silicones, paraffins, asphalt, waxes, and combinations thereof. Although not used in many embodiments of the invention, when used suitable air-entraining agents include, but are not limited to vinsol resins, sodium abietate, fatty acids and salts thereof, tensides, alkyl-aryl-sulfonates, phenol ethoxylates, lignosulfonates, and mixtures thereof.

The concrete composition of the present method can be prepared, made and/or produced by combining cement, water, expanded polymer particles, and any other aggregates, additives and/or adjuvants to provide a uniform and/or homogeneous dispersion of expanded polymer particles in the concrete composition of the present method.

In embodiments of the invention, cement, water and optionally aggregates and optionally additives are combined to form an aqueous cement slurry. The expanded polymer particles are then added to the aqueous cement slurry to form a dispersion of expanded polymer particles in a concrete composition of the present method.

When preparing the concrete composition of the present method, it is often desirable to meter or add the expanded polymer particles to the aqueous cement slurry over a period of time to aid in uniform incorporation and to avoid clumping or aggregation of the expanded polymer particles to localized regions of the concrete composition.

As indicated above, the expanded polymer particles can be aged prior to being added to the aqueous cement slurry. In particular embodiments of the invention, the expanded polymer particles can be aged in maturing silos or hoppers prior to adding them to the aqueous cement slurry.

In embodiments of the invention, the expanded polymer particles are added to the aqueous cement slurry using one or more of gravity, pneumatic conveyance, an augur system, and/or conveyor belts. Prior to being added to the aqueous cement slurry, the expanded polymer particles can be moved via gravity, pneumatic conveyance, an augur system, and/or conveyor belts to one or more load cells and then conveyed to the aqueous cement slurry. In this latter embodiment, the load cell can be used in a feedback loop to regulate the rate at which the expanded polymer particles are added to the aqueous cement slurry as well as the overall amount of expanded polymer particles added to the aqueous cement slurry.

In many embodiments of the invention, the expanded polymer particles are added to the aqueous cement slurry over a period of time of at least 30 seconds, in some cases at least 45 seconds and in other cases at least one minute and can be added over a period of time of up to five minutes, in some cases up to four minutes and in other cases up to three minutes. The expanded polymer particles can be added to the aqueous cement slurry over any period of time or range between any of the periods of time indicated above.

In particular embodiments of the invention, the expanded polymer particles are aged in maturing silos or hoppers as described above, conveyed to one or more load cells; and then conveyed to the aqueous cement slurry.

In embodiments of the invention, when the expanded polymer particles are conveyed, they can be conveyed or added to the aqueous cement slurry using one or more of a metering device or a rotary airlock device. In these embodiments, individual compartments containing expanded polymer particles are moved along a belt or ramp. The smaller the individual compartments, the more accurate the amount of added expanded polymer particles will be. In particular embodiments of the invention, the individual compartments can be at least 0.001%, in some cases at least 0.0025% and in other cases 0.005% and can be up to 1%, in some cases up to 0.75%, and in other cases up to 0.5% of the total volume of expanded polymer particles to be added to the aqueous cement slurry. The size of the individual compartments is typically determined based on the accuracy required, the rate of addition, and the volume of expanded polymer particles to be added to the aqueous cement slurry. The size of the individual compartments can be any value or range between any of the values recited above.

In many embodiments of the invention, the mixing method provides a concrete composition ready for discharge from a mixer in no more than five minutes, in some cases no more than four minutes and thirty seconds and in other cases no more than four minutes.

In particular embodiments of the invention, the mixing method is carried out using a control system, which is provided for automatic operation of the steps in the method. In specific embodiments, the load cell and interfaces with metering devices, rotary airlock device, gravity feed devices, pneumatic conveyance devices, augur systems, and/or conveyor belts are automated through the control system.

In many embodiments of the invention, the control system includes a microprocessor based batching controller with weight indicator. Further to this embodiment, batch weights can be entered into the batching controller and the steps are completed in an automatic and or automated fashion thereafter.

In some embodiments of the invention, the expanded polymer particles can be combined with at least a portion of the water used to form the slurry. The combination can be sprayed under pressure to add the expanded polymer particles to the aqueous cement slurry. This embodiment can be combined with many of the other various mixing embodiments described herein. In particular aspects of this embodiment, the expanded polymer particles can be combined with the water by way of an eductor and introduced to a mixer to form the aqueous cement slurry.

In other embodiments of the invention, the expanded polymer particles can be combined with at least a portion of the cement and added to a mixer to form the concrete composition of the present method.

The density of the concrete composition of the present method can be at least 40 lb/ft$^3$ (0.64 g/cc), in some cases at least 45 lb/ft$^3$ (0.72 g/cc) and in other cases at least 50 lb/ft$^3$ (0.8 g/cc) lb/ft$^3$ and the density can be up to 135 lb./ft$^3$ (2.1 g/cc), in some situations up to 130 lb/ft$^3$ (2.1 g/cc), in some cases 120 lb/ft$^3$ (1.9 g/cc), in other cases up to 115 lb/ft$^3$ (1.8 g/cc), in some circumstances up to 110 lb/ft$^3$ (1.75 g/cc), in other circumstances up to 105 lb/ft$^3$ (1.7 g/cc), in some instances up to 100 lb/ft$^3$ (1.6 g/cc), and in other instances up to 95 lb/ft$^3$ (1.5 g/cc). The density of the concrete composition of the present method can be any value and can range between any of the values recited above. The density of the concrete compositions can be determined according to ASTM C 138.

The methods of the present invention can be used with any type of concrete application, but are particularly useful when placing ready mix concrete at heights above the discharge point of a ready mix concrete truck.

As non-limiting examples, ready mix can include central-mixed concrete, transit-mixed concrete, and shrink-mixed concrete.

Central-mixed concrete is completely mixed at a plant and then transported in a truck-mixer or agitator truck. Freshly mixed concrete compositions can be transported in an open dump truck if the jobsite is near the plant. Slight agitation of the concrete during transit prevents segregation of the materials and reduces the amount of slump loss.

In transit-mixed (also known as truck-mixed) concrete, materials are batched at a central plant and are completely mixed in the truck in transit. Frequently, the concrete composition is partially mixed in transit and mixing is completed at the jobsite. Transit-mixing keeps the water separate from the cement and aggregates and allows the concrete to be mixed immediately before placement at the construction site. This method avoids the problems of premature hardening and slump loss that result from potential delays in transportation or placement of central-mixed concrete. Additionally, transit-mixing allows concrete to be hauled to construction sites further away from the plant. A disadvantage to transit-mixed concrete, however, is that the truck capacity is smaller than that of the same truck containing central-mixed concrete.

Shrink-mixed concrete is used to increase the truck's load capacity and retain the advantages of transit-mixed concrete. In shrink-mixed concrete, the concrete composition is partially mixed at the plant to reduce or shrink the volume of the mixture and mixing is completed in transit or at the jobsite.

Ready mixed concrete is often remixed once it arrives at the jobsite to ensure that the proper slump is obtained. However, concrete that has been remixed tends to set more rapidly than concrete mixed only once. Materials, such as water and some varieties of admixtures, are often added to the concrete composition at the jobsite after it has been batched to ensure that the specified properties are attained before placement.

The concrete compositions of the present method can be designed for specific applications. As non-limiting examples, a high slump concrete composition can be desirable when the concrete must be placed around a high concentration of reinforcing steel. Also, a low slump concrete composition can be desirable when concrete is placed in large open forms, or when the form is placed on a slope.

As such, in some embodiments of the invention, the concrete compositions will have a measurable slump value, sampled according to ASTM C 172 (Standard Practice for Sampling Freshly Mixed Concrete) and measured according to ASTM C 143 (Standard Test Method for Slump of Hydraulic Cement Concrete). The exact slump value is designed into a particular mix and will depend on the application and the design of the concrete composition. In typical use, the slump will range from at least about 2 inches (5 cm) and in some cases at least about 3 inches (7.6 cm) to up to about 8 inches (20 cm), in some cases up to about 7 inches (18 cm) and in other cases up to about 6 inches (15 cm). If the concrete delivered to a project is too stiff (low slump) it may be difficult to discharge it from a truck. If the slump is too high, the concrete may not be useable. As indicated above, the concrete compositions of the present method resist the low slump problem. In this embodiment, the slump can be any value recited above or range between any of the recited values.

In other particular embodiment of the invention, the concrete composition of the present method is used in traditional ready mix application, which include, but are not limited to tilt up construction, pour in place, lightweight grouts, ICF fill and other applications where concrete is poured or pumped and transported, for example in ready-mix trucks, to job sites.

Figure 7:
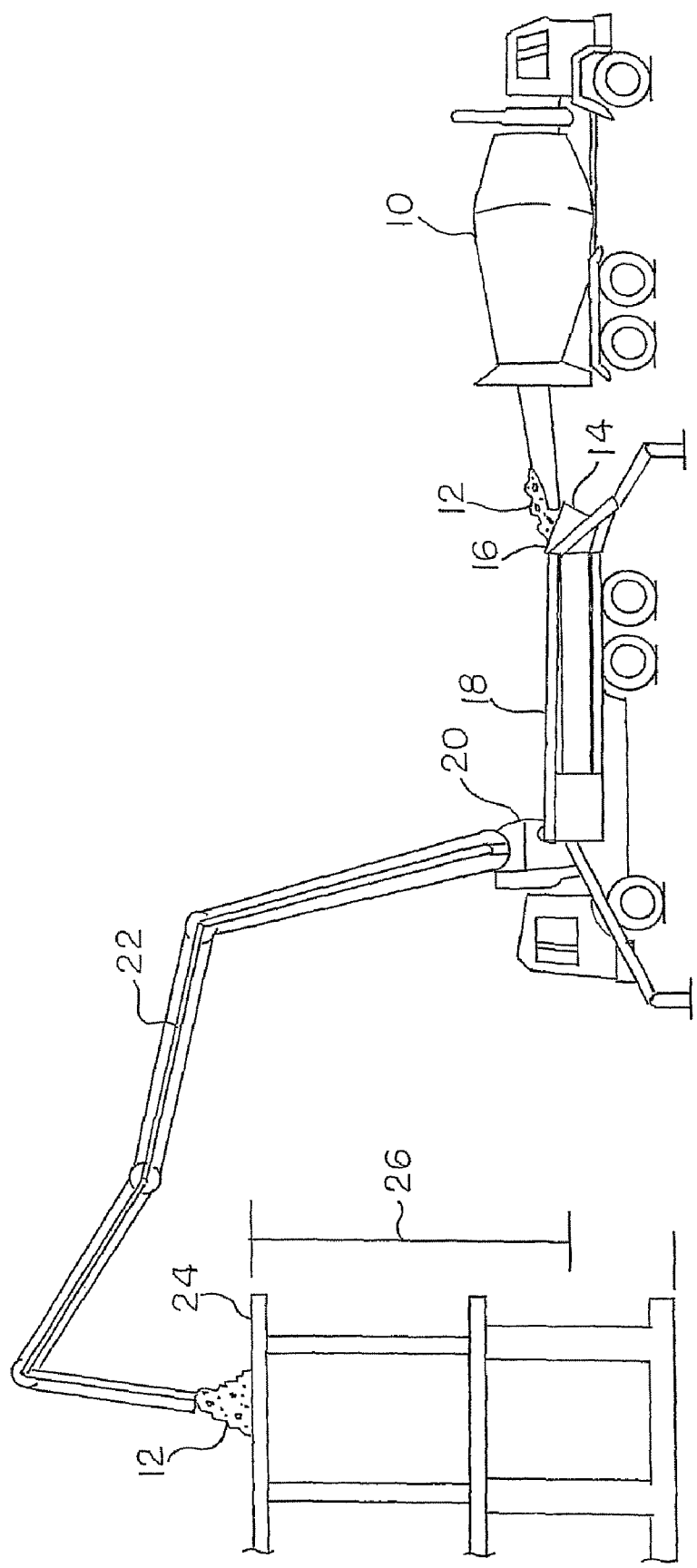
FIG. 7 is a schematic showing methods according to the present invention.

In embodiments no the invention shown in FIG. 7, ready mix truck 10 discharges concrete 12 to hopper 14 at delivery point 16. Concrete 12 travels from hopper 14 through hose 18 to pump 20. Pump 20 conveys concrete 12 through boom arm 22 to placement point 24, which is a height 26 above delivery point 16.

As used herein, the phrase "pumping the concrete composition to a point higher in elevation than the delivery point of the concrete to place the concrete" refers to the act of pumping the concrete composition of the present method from delivery point 16 to height 26 and placing concrete 12 at placement point 24.

As used herein, the term "slump loss on pumping" or "SLP" refers to the slump of a concrete composition at the delivery point ("SD") minus the slump of the concrete composition after being pumped to a placement point ("SP") for each 10 feet (3 m) in height (H). This value can be calculated as follows:

$$SLP=(SD-SP)\times(H/10)$$

In embodiments of the invention, the slump loss on pumping or SLP, is less than 3 inches/10 feet, in some cases less than 2.5 inches/10 feet, in other cases less than 2 inches/10 feet, in some instances less than 1.5 inches/10 feet, in other instances less than 1 inch/10 feet, in some situations less than 0.5 inches/10 feet, and in other situations less than 0.25 inches/10 feet.

In embodiments of the invention, the slump loss on pumping will refer to horizontal pumping, in which case H refers to linear distance. In other cases, H can refer to total distance as a combination of vertical height and linear distance. In all such instances, slump loss is minimized with the concrete composition of the present invention compared to concrete compositions containing traditional light weighting aggregate.

As used herein, the term "slump loss on mixing" or "SLM" refers to the slump of a concrete composition when initially mixed ("SO") minus the slump of the concrete composition after being mixed for a period of time (T) in minutes ("ST") for each one hour of mixing. This value can be calculated as follows:

$$SLM=(SO-ST)\times(T/60)$$

In embodiments of the invention, the slump loss on mixing or SLM, is less than 3 inches/hour, in some cases less than 2.5 inches/hour, in other cases less than 2 inches/hour, in some instances less than 1.5 inches/hour, in other instances less than 1 inch/hour, in some situations less than 0.5 inches/hour, and in other situations less than 0.25 inches/hour.

As indicated above, a particular advantage in the present method is that the slump loss of the concrete composition of the present method is minimized when it is pumped to a point higher in elevation than the delivery point of the concrete and/or mixed for an extended period of time (typically up to 60 minutes after initially combining the ingredients). As such, the slump of the concrete after being pumped to the placement point and/or after extended mixing will range from at least about 1 inches (2.5 cm) and in some cases at least about 2 inches (5 cm) to up to about 8 inches (20 cm), in some cases up to about 7 inches (18 cm) and in other cases up to about 6 inches (15 cm). The slump of the placed concrete can be any value or range between any of the values recited above.

As indicated above, in embodiments of the present method, on or more concrete mixing trucks containing the concrete composition of the present method feed a collecting hopper. The collecting hopper is connected to a suitable concrete pump. The collecting hopper and pump can be mounted on a vehicle or truck.

Any suitable concrete pump can be used as long as it is equipped to handle large quantities of concrete and transport it by means of pumping through pipelines over appreciable distances, often to locations that may not be easily accessible by other means of delivery. Non-limiting examples of suitable pumps include direct acting pumps and squeeze pumps.

Suitable direct-acting concrete pumps include static or portable pumps, which can, in the latter case, include mounting the pump on a suitable vehicle or truck. Truck-mounted concrete pumps typically operate with shorter delivery pipelines. The pump feeds concrete to the delivery pipeline attached to a hydraulically-maneuvered articulated telescopic arm referred to as the placing boom. The pipeline length thus corresponds to the horizontal reach of the placing boom. Using direct acting pumps, concrete can be readily pumped up to distances of 950 feet (450 m) horizontally or 106 feet (50 m) vertically. For larger distances, relay pumping using pumps in series can be adopted.

Squeeze pumps can also be truck-mounted and deliver concrete using a placing boom. Squeeze pumps can transport concrete up to a maximum distance of 190 feet (90 m) horizontally or 64 feet (30 m) vertically.

A particular advantage of the present method is that smaller pumps that utilize less energy can be used to place the concrete composition of the present method. Additionally, the concrete compositions according to the present method cause less wear on pumps compared with normal weight concrete compositions and light weight concrete compositions that only utilize traditional light weighting agents.

In embodiments of the invention of particular note, many of the concrete compositions according to the present method do not require that the pump be primed. So time is saved by not having to include a pump priming step in the present method.

In the present method, the system for pumping concrete can include a hopper into which the concrete is discharged from a mixer, which in turn, feeds the concrete pump itself and the delivery pipelines through which the concrete is delivered.

To be able to achieve a targeted output of concrete at a pour site, the required pumping pressure can be a limiting factor. Particular advantages of the present method include the lower density and lower slump loss of the concrete composition, both of which result in lower pumping pressure when placing the concrete composition. This is important since the pumping pressure decreases from a maximum at the concrete pump to zero at the output end of the delivery pipeline.

As used herein, the term "maximum lead" refers to and includes the total maximum horizontal and/or vertical distance over which the concrete composition is to be pumped. The maximum lead in terms of the horizontal and vertical placing distance can be calculated by taking into account likely increases in the pumping distance due to bends and directional changes in the delivery pipe. Directional changes in the flow of pumped concrete can place excess demand on the pumping unit and these are accounted for by adding an equivalent horizontal length of the pipeline for different types of pipe bends.

In the present invention, the concrete compositions of the present invention have a maximum lead on a given configuration of pumps and pipes that is at least 10% longer than the maximum lead for concrete formulations that use more than 20% of traditional light weighting aggregates having the same density as the concrete compositions of the present invention.

The diameter of the pipes can be at least 2 inches (5 cm), in some cases at least 3 inches (7.5 cm) and in other cases at least 4 inches (10 cm) and can be up to 24 inches (61 cm), in some cases up to 18 inches (46 cm) and in other cases up to 12 inches (30.5 cm). The diameter of the pipes can be any value or range between any of the values recited above. Additionally, combinations of pipe sizes can be used when appropriate.

After being placed, the concrete compositions of the present method, when set and/or hardened, have a compressive strength of at least about 1400 psi (98 kgf/cm$^2$), in some cases at least about 1500 psi (105.5 kgf/cm$^2$), in other cases at least about 1600 psi (112.5 kgf/cm$^2$), in some instances at least about 1800 psi (126.5 kgf/cm$^2$), and in other instances at least about 2000 psi (140.6 kgf/cm$^2$) and optionally can be up to about 3600 psi (253 kgf/cm$^2$) in some cases up to about 3300 psi (232 kgf/cm$^2$) and in other cases up to about 3000 psi (211 kgf/cm$^2$). In other embodiments of the invention, the concrete compositions of the present method have structural compressive strengths of about 4000 psi (281 kgf/cm$^2$) or greater in 48 hours for post-tensioned applications and 28-day compressive strengths of about 4500 psi (316 kgf/cm$^2$) or greater. In these embodiments, compressive strengths are determined according to ASTM C39 at 28 days. The exact compressive strength of a concrete composition will depend on its formulation, density and intended application. The compressive strength of the concrete compositions of the present method can be any value or range between any of the values recited above.

The concrete compositions of the present method can be used in most, if not all, applications where traditional concrete formulations are used. As non-limiting examples, the concrete compositions of the present method can be used in structural and architectural applications, non-limiting examples being party walls, ICF or SIP structures, floor systems, roof or ceiling systems, road beds, bird baths, benches, shingles, siding, drywall, cement board, decorative pillars or archways for buildings, etc., furniture or household applications such as counter tops, in-floor radiant heating systems, floors (primary and secondary), tilt-up walls, sandwich wall panels, as a stucco coating, road and airport safety applications such as arresting walls, Jersey Barriers, sound barriers and walls, retaining walls, runway arresting systems, air entrained concrete, runaway truck ramps, flowable excavatable backfill, and road construction applications such as road bed material and bridge deck material.

When the concrete compositions of the present method are used in road bed construction, the expanded polymer particles can aid in preventing and or minimizing crack propagation, especially when water freeze-thaw is involved.

The concrete compositions of the present method are well suited to the fabrication of molded construction articles and materials, non-limiting examples of such include wall panels including tilt-up wall panels, T beams, double T beams, roofing tiles, roof panels, ceiling panels, floor panels, I beams, foundation walls and the like.

In an embodiment of the invention, the molded construction articles and materials can be pre-cast and/or pre-stressed.

As used herein, "pre-cast" concrete refers to concrete poured into a mold or cast of a required shape and allowed to cure and/or harden before being taken out and put into a desired position.

In embodiments of the invention, the concrete compositions can be used in pre-cast applications, which include, but are not limited to precast parts such as beams, double-Ts, pipes, insulated walls, pre-stressed products, and other products where the concrete composition is poured directly into forms and final parts are transported to job sites by truck. In these embodiments of the invention, the slump value ranges from at least about 8 inch (20 cm) and in some cases at least about 10 inches (25.4 cm) to up to about 20 inches (50 cm), in some cases up to about 18 inches (46 cm) and in other cases up to about 16 inches (41 cm). In these embodiments, the slump can be any value or range between any of the recited values.

As used herein, "pre-stressed" concrete refers to concrete whose tension has been improved by using pre-stressing tendons (in many cases high tensile steel cable or rods), which are used to provide a clamping load producing a compressive strength that offsets the tensile stress that the concrete member would otherwise experience due to a bending load. Any suitable method known in the art can be used to pre-stress concrete. Suitable methods include, but are not limited to Pre-tensioned concrete, where concrete is cast around already tensioned tendons, and post-tensioned concrete, where compression is applied after the pouring and curing processes.

The present invention will further be described by reference to the following examples. The following examples are merely illustrative of the invention and are not intended to be limiting. Unless otherwise indicated, all percentages are by weight and Portland cement is used unless otherwise specified.

EXAMPLE 1

The following example demonstrates the methods according to the present invention. The ingredients were combined in 216 ft$^3$ batches in a standard ready mix concrete mixer truck. The prepuff particles had a bulk density of 1.4 lb/ft$^3$ available as ELEMIX™ concrete additive from Syntheon Inc., Pittsburgh, Pa. The ingredients were combined in the following order 70% of aggregates (sand and stone), 70% of water and air entraining agent (AEA), 100% of cement, 30% of aggregates, 30% of water and AEA, prepuff and WR. The ingredients were combined in the following order:

| | |
|---|---|
| 365 kg/m$^3$ | cement |
| 50 kg/m$^3$ | fly ash (Class F) |
| 895 kg/m$^3$ | sand |
| 400 kg/m$^3$ | stone |
| 165 kg/m$^3$ | water |
| 7.5 kg/m$^3$ | prepuff |
| 1012 ml/100 kg | WR |

The concrete batches were pumped using a Putzmeister 38Z, having a 38-Meter, 5-inch diameter line reduced to a 3-inch soft line from two truck (Sample 1 and Sample 2). The concrete was placed and screeded into a 20'×60' form having a thickness of 6 to 8 inches using a straight edge, a 4-foot bull float was used for leveling. The surface was left to cure and a rough textured broom finish was placed on the surface. No fiberboard expansion joints were used.

All other peripheral materials (slump cone, tamping rods, etc.) adhered to the applicable Canadian Standards Association methods under CSA A23.2. Specific methods included A23.2-C—Sampling plastic concrete 365; A23.2-4C—Air content of plastic concrete by the pressure method 380; A23.2-5C—Slump and slump flow of concrete 384; A23.2-6C—Density, yield, and cementing materials factor of plastic concrete 391; and A23.2-9C—Compressive strength of cylindrical concrete specimens 403. Test specimens for compressive strength were ground level and capped with sulfur compound. The amount of air was determined using a pressure meter. The test results are shown in the table below.

|  | Sample 1 | Sample 2 |
|---|---|---|
| Before Pumping |  |  |
| Density (pcf) | 121 | 116 |
| Slump (in) | 2.8 | 6.3 |
| Air (%) | — | 6.1 |
| After Pumping |  |  |
| Density (pcf) | 124 | 121 |
| Slump (in) | 4.5 | — |
| Air (%) | 7.55 | 7.75 |
| Compressive strength (psi) 7-day | 2306 | — |
| Compressive strength (psi) 28-day | 2930 | — |
| Compressive strength (psi) 56-day | 3220 | — |

Of particular note, the pressure at the pump truck was 102 bar. On a typical normal weight concrete mix, the pump pressure is generally between 110-120 bar. The concrete mixture according to the present method pumped with less than typical pressures. In addition the operator did not need to prime the pump with a grout mix before pumping, as is usually required with normal weight concrete mixes.

The weather conditions during placement were very poor (high winds, low humidity) at the time of the pour and would be expected to be favorable for promoting cracking in the poured slab. The concrete slab did not show signs of plastic shrinkage cracking after seven days of placement, even though the concrete composition according to the present method was not placed using fiberboard expansion joints.

EXAMPLE 2

The following example demonstrates the methods according to the present invention. The ingredients were combined in 10 yd$^3$ batches in a standard ready mix concrete mixer truck. The prepuff particles had a bulk density of 1.4 lb/ft$^3$ available as ELEMIX™ concrete additive from Syntheon Inc., Pittsburgh, Pa. The ingredients were used: sand (Hanson aggregate PMA), coarse aggregate (Hanson aggregate PMA 57 gravel), Portland cement (Type 1, Essroc), fly ash (type C), water, prepuff and water reducer (WR).

| 326 kg/m$^3$ | cement |
|---|---|
| 103 kg/m$^3$ | fly ash |
| 888 kg/m$^3$ | sand |
| 420 kg/m$^3$ | gravel |
| 195 kg/m$^3$ | water |
| 6.1 kg/m$^3$ | prepuff |
| 8812 ml/100 kg | WR |

The concrete batches were pumped vertically approximately 100 feet from a concrete truck and pump into an empty ready-mix truck positioned on a bridge deck above the pump. The concrete was tested for various properties before and after pumping. The concrete was approximately 2.25 hours old when pumped. The weather conditions were windy with light rain, approximately 45° F. In spite of the prevailing conditions, the concrete composition according to the present method pumped very well.

Compression testing was performed on a Forney FX250/300 Compression Tester (Forney Incorporated, Hermitage, Pa.), which hydraulically applies a vertical load at a desired rate. All other peripheral materials (slump cone, tamping rods, etc.) adhered to the applicable ASTM test method. The following ASTM test methods and procedures were followed: ASTM C470—Standard Specification for Molds for Forming Concrete Test Cylinders Vertically, ASTM C192—Standard Practice for Making and Curing Concrete Test Specimens in the Laboratory, ASTM C330—Standard Specification for Lightweight Aggregates for Structural Concrete, ASTM C143—Standard Test Method for Slump of Hydraulic-Cement Concrete, ASTM C1231—Standard Practice for Use of Unbonded Caps in Determination of Compressive Strength of Hardened Concrete Cylinders, ASTM C39—Standard Test Method for Compressive Strength of Cylindrical Concrete Specimens. The amount of air was determined using a pressure meter. The test results are shown in the table below.

| Before Pumping |  |
|---|---|
| Density (pcf) | 126 |
| Slump (in) | 3.5 |
| Air (%) | 3.3 |
| After Pumping |  |
| Density (pcf) | 129 |
| Slump (in) | 2.5 |
| Air (%) | 3.5 |
| Compressive strength (psi) |  |
| 7-day | 2718 |
| 28-day | 3840 |
| 56-day | 4454 |

EXAMPLE 3

The following examples demonstrate the methods according to the present invention. The ingredients in the table below were combined in a 270 ft$^3$ batch in a standard ready mix concrete mixer truck. The prepuff particles had a bulk density of 1.4 lb/ft3 available as ELEMIX™ concrete additive from Syntheon Inc., Pittsburgh, Pa. The ingredients were combined in the following order 70% of aggregates (sand, stone, light weight aggregate), 70% of water and air entraining agent (AEA), 100% of cement, 30% of aggregates, 30% of water and AEA, prepuff and WR. Particular ingredients were sand (Hanson aggregate PMA), coarse aggregate (Hanson aggregate PMA 57 gravel), Portland cement (Type 1, Essroc), fly ash (type C), water, prepuff and water reducer (WR) and/or air entraining agent (AEA). The comparative traditional light weight aggregate was HAYDITE® (Buildex, Inc., Ottawa, Kansas). All ingredients are expressed as lb/yard$^3$ except WR and AEA are expressed as oz/cwt.

The concrete batches were pumped using a Putzmeister BSF 40Z 16H, having a 40-Meter using a four-section Multi-Z concrete boom pump. Each concrete sample was placed and screeded into 15'×15' forms having a thickness of 6 to 8 inches using a straight edge, a 4-foot bull float was used for leveling. The surface was left to cure and a rough textured broom finish was placed on the surface. The samples containing prepuff were finished with a power trowel. Except for the samples containing prepuff particles according to the present method, fiberboard expansion joints were used.

All of the concrete samples were pumped at 3.5 to 5 gallons per second.

Compression testing was performed on a Forney FX250/300 Compression Tester (Forney Incorporated, Hermitage, Pa.), which hydraulically applies a vertical load at a desired rate. All other peripheral materials (slump cone, tamping rods, etc.) adhered to the applicable ASTM test method. The following ASTM test methods and procedures were followed: ASTM C470—Standard Specification for Molds for Forming Concrete Test Cylinders Vertically, ASTM C192—Standard Practice for Making and Curing Concrete Test Specimens in the Laboratory, ASTM C330—Standard Specification for Lightweight Aggregates for Structural Concrete, ASTM C143—Standard Test Method for Slump of Hydraulic-Cement Concrete, ASTM C 1231—Standard Practice for Use of Unbonded Caps in Determination of Compressive Strength of Hardened Concrete Cylinders, ASTM C39—Standard Test Method for Compressive Strength of Cylindrical Concrete Specimens. The amount of air was determined using a pressure meter. The test results are shown in the table below.

|  | Sample | | | | |
| --- | --- | --- | --- | --- | --- |
|  | A | B | C | D | E |
| Description | Normal weight concrete (prior art) | Traditional light weight concrete (prior art) | Inventive | Inventive | Inventive |
| Cement | 502 | 520 | 600 | 560 | 540 |
| Fly ash | 100 | 120 | 80 | 90 | 79 |
| Sand | 1252 | 1402 | 1541 | 1743 | 1722 |
| Prepuff | — | — | 10.9 | 8.8 | 6.7 |
| Coarse Aggregate | 1744 | — | 712 | 712 | 910 |
| Light weight aggregate | — | 947 | — | — | — |
| Water | 260 | 293 | 294 | 278 | 252 |
| WR | 5 | 4.5 | 8 | 11.3 | 9 |
| AEA | 0.7 | 0.6 | — | — | — |
| W/C ratio | 0.43 | 0.46 | 0.43 | 0.43 | 0.41 |
| Before Pumping | | | | | |
| Density (pcf) | 147 | 129 | 122 | 128 | 134 |
| Slump (in) | 6.75 | 4.75 | 3 | 1.25 | 1 |
| Air (%) | 2.4 | 4.7 | 4.9 | 4.7 | 4.3 |
| Pump Pressure | 130-162 bar | 80-100 bar | 80-110 bar | 100-130 bar | 120-190 bar |
| After Pumping | | | | | |
| Density (pcf) | 143 | 128 | 125 | 130 | 136 |
| Slump (in) | 6 | 7.25 | 5 | 2.5 | 1.5 |
| Air (%) | 3.4 | 3.5 | 6 | 5.6 | 4.8 |
| Compressive strength (psi) | | | | | |
| 7-day | 4970 | 3520 | 2210 | 2275 | 3480 |
| 28-day | 6220 | 5950 | 2730 | 3385 | 4510 |

Sample B (traditional light weighting agent) showed a decrease in the amount of air in the concrete after pumping, while the normal weight concrete and the compositions according to the present method showed an increase in the amount of air in the compositions.

None of the concrete samples showed signs of plastic shrinkage cracking after seven days of placement, even though the concrete compositions according to the present method were not placed using fiberboard expansion joints.

The present invention has been described with reference to specific details of particular embodiments thereof. It is not intended that such details be regarded as limitations upon the scope of the invention except insofar as and to the extent that they are included in the accompanying claims.

We claim:

1. A method of placing a light weighted concrete compositions comprising:
    a) combining ingredients comprising 3-40 volume percent cement, 5-50 volume percent fine aggregate, 1.5-50 volume percent coarse aggregate, and 10-22 volume percent water to form a concrete mixture;
    b) during or after (a), adding 5-40 volume percent of prepuff particles to the concrete mixture to form a light weighted concrete composition; and
    c) pumping the light weighted concrete composition to a point higher in elevation than the delivery point of the concrete to place the concrete;
    wherein the light weighted concrete composition contains less than 30 volume percent of other light weighting aggregates;
    wherein the prepuff particles have an average particle diameter of from 0.2 mm to 8 mm, a bulk density of from 0.02 g/cc to 0.64 g/cc, an aspect ratio of from 1 to 3;
    wherein the slump value of the placed light weighted concrete composition measured according to ASTM C 143 is greater than 1 inch; and
    wherein the light weighted concrete composition has a density of from about 40 to about 135 lb./ft$^3$.

2. The method according to claim 1, wherein the prepuff particles have a substantially continuous outer layer.

3. The method according to claim 1, wherein the prepuff particles comprise expanded polymer particles comprising one or more polymers selected from the group consisting of homopolymers of vinyl aromatic monomers; copolymers of at least one vinyl aromatic monomer with one or more of divinylbenzene, conjugated dienes, alkyl methacrylates, alkyl acrylates, acrylonitrile, and/or maleic anhydride; polyolefins; polycarbonates; polyesters; polyamides; natural rubbers; synthetic rubbers; and combinations thereof.

4. The method according to claim 1, wherein the cement comprises one or more materials selected from the group consisting of Portland cements, pozzolana cements, gypsum cements, gypsum compositions, aluminous cements, magnesia cements, silica cements, slag cements, Type I cement, Type IA cement, Type II cement, Type IIA cement, Type III cement, Type IIIA cement, Type IV cement and Type V cement.

5. The method according to claim 1, wherein the coarse aggregate is selected from the group consisting of stone, gravel, glass, expanded slate, clay; pumice, perlite, vermiculite, scoria, diatomite, expanded shale, expanded clay, expanded slag, pelletized aggregate, extruded fly ash, tuff, macrolite, slate, expanded blast furnace slag, sintered fly ash, coal cinders, and combinations thereof.

6. The method according to claim 1, wherein the concrete mixture comprises one or more supplementary cementitious materials.

7. The method according to claim 1, wherein the concrete mixture contains one or more materials selected from the group consisting of plasticizers, fibers, supplementary cementitious materials and pozzalans.

8. The method according to claim 7, wherein the fibers are selected from the group consisting of glass fibers, silicon carbide, aramid fibers, polyester, carbon fibers, composite fibers, fiberglass, combinations thereof, fabric containing said fibers, and fabric containing combinations of said fibers.

9. The method according to claim 1, wherein the fine aggregate is selected from the group consisting of sand, glass, pumice, perlite, vermiculite, coal cinders, and combinations thereof.

10. The method according to claim 1, wherein the concrete mixture has a slump value measured according to ASTM C 143 of from 2 to 16 inches.

11. The method according to claim 1, wherein after the concrete mixture is set for 28 days, has a compressive strength of at least 1400 psi as tested according to ASTM C39.

12. The method according to claim 1, wherein the prepuff particles are aged prior to being added to the aqueous cement slurry.

* * * * *